(12) United States Patent
McClanahan et al.

(10) Patent No.: US 8,469,622 B2
(45) Date of Patent: Jun. 25, 2013

(54) PINNED CONNECTIONS

(75) Inventors: Robert McClanahan, Milwaukie, OR (US); Carolyn Shapiro, Portland, OR (US); Robin K Churchill, Aloha, OR (US)

(73) Assignee: ESCO Corporation, Portland, OR (US)

( * ) Notice: Subject to any disclaimer, the term of this patent is extended or adjusted under 35 U.S.C. 154(b) by 937 days.

(21) Appl. No.: 12/273,416

(22) Filed: Nov. 18, 2008

(65) Prior Publication Data

US 2009/0136291 A1    May 28, 2009

Related U.S. Application Data

(60) Provisional application No. 60/990,258, filed on Nov. 26, 2007, provisional application No. 60/990,262, filed on Nov. 26, 2007.

(51) Int. Cl.
*F16C 11/00* (2006.01)

(52) U.S. Cl.
USPC ............................. 403/154; 403/151; 37/399

(58) Field of Classification Search
USPC .. 403/150, 151, 154, 156, 157, 6, 10; 37/394, 37/396, 397, 398, 399
See application file for complete search history.

(56) References Cited

U.S. PATENT DOCUMENTS

| | | | |
|---|---|---|---|
| 847,719 A | 3/1907 | Arnold | |
| 1,363,477 A | 12/1920 | Lowe | |
| 1,724,985 A * | 8/1929 | Winterbottom | 403/154 |
| 1,819,887 A * | 8/1931 | Fry et al. | 403/156 |
| 1,927,241 A * | 9/1933 | McCullough | 254/415 |
| 2,967,726 A | 1/1961 | Weston | |
| 3,274,879 A | 9/1966 | Poller | |
| 3,606,406 A | 9/1971 | Walters | |
| 3,797,949 A | 3/1974 | Petros | |
| 3,979,994 A | 9/1976 | Collignon | |
| 4,089,382 A | 5/1978 | Pessier | |
| 4,337,614 A | 7/1982 | Briscoe | |
| 4,597,499 A | 7/1986 | Hanula | |
| 4,684,280 A | 8/1987 | Dirkin et al. | |
| 4,786,202 A | 11/1988 | Arnold et al. | |
| 4,791,738 A | 12/1988 | Briscoe | |
| 4,804,588 A | 2/1989 | Murphy, Jr. et al. | |
| 4,896,989 A | 1/1990 | Swager | |
| 4,932,807 A | 6/1990 | Rhodes | |
| 5,044,812 A | 9/1991 | Ardelt et al. | |
| 5,046,881 A | 9/1991 | Swager | |
| 5,084,990 A | 2/1992 | Briscoe | |
| 5,088,214 A | 2/1992 | Jones | |
| 5,321,902 A * | 6/1994 | Gregory | 37/397 |
| 5,525,001 A | 6/1996 | Perkins | |
| 5,577,858 A | 11/1996 | Kasim et al. | |
| 5,597,260 A | 1/1997 | Peterson | |
| 5,599,150 A | 2/1997 | Edwards et al. | |

(Continued)

FOREIGN PATENT DOCUMENTS

JP         52121161        10/1977

*Primary Examiner* — Michael P Ferguson
(74) *Attorney, Agent, or Firm* — Steven P. Schad

(57) ABSTRACT

Improved connection systems for pinned connections are disclosed. Although the connection systems may be utilized in dragline excavating systems, the connection systems may also be utilized for pinned connections in a variety of other types of mining, dredging, forestry, and construction equipment. An insert utilized in the connections systems has a frustroconical shape that joins with an aperture in an element being joined by the connection system.

8 Claims, 33 Drawing Sheets

U.S. PATENT DOCUMENTS

| | | |
|---|---|---|
| 5,619,810 A | 4/1997 | Kasim |
| 5,791,809 A | 8/1998 | Bessey |
| 5,865,557 A | 2/1999 | Kasim |
| 5,913,605 A | 6/1999 | Jusselin et al. |
| 5,992,061 A | 11/1999 | Fleck et al. |
| 6,074,126 A | 6/2000 | Hunter et al. |
| 6,092,958 A | 7/2000 | Gale |
| 6,158,917 A | 12/2000 | Wolin et al. |
| 6,209,234 B1 | 4/2001 | Meyers |
| 6,357,955 B1 | 3/2002 | Hiemstra et al. |
| 7,032,334 B2 | 4/2006 | Pippins |
| 2006/0099838 A1 | 5/2006 | Meyers |
| 2006/0127239 A1 | 6/2006 | Adamic et al. |

\* cited by examiner

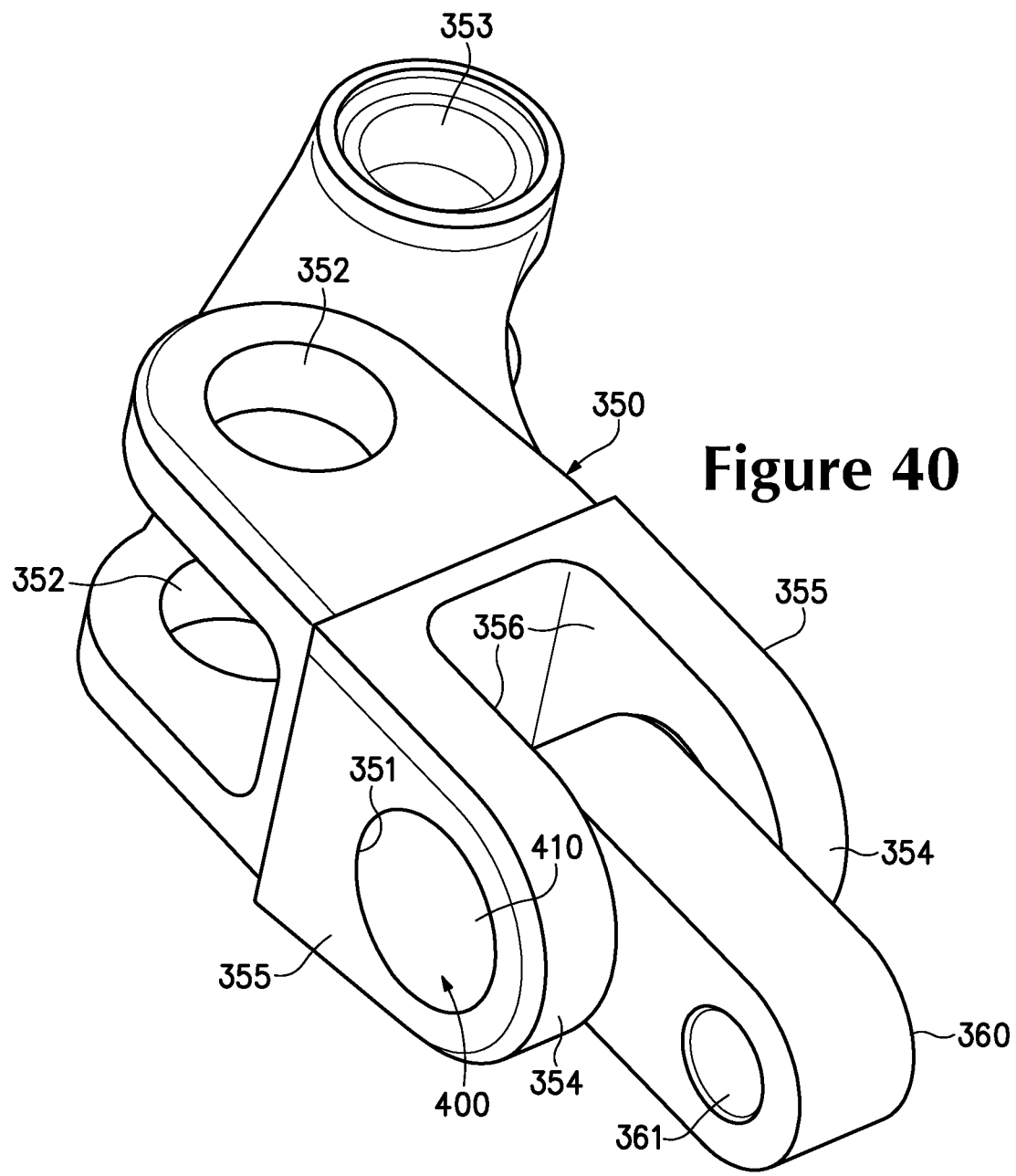

PINNED CONNECTIONS

CROSS-REFERENCE TO RELATED APPLICATION

This non-provisional U.S. Patent Application claims priority under 35 U.S.C. §119(e)(1) to each of (1) provisional U.S. Patent Application Ser. No. 60/990,258, which was filed in the U.S. Patent and Trademark Office on 26 Nov. 2007 and entitled Retaining System For A Pinned Connection and (2) provisional U.S. Patent Application Ser. No. 60/990,262, which was filed in the U.S. Patent and Trademark Office on 26 Nov. 2007 and entitled Bushing System For A Pinned Connection, such provisional U.S. patent applications being entirely incorporated herein by reference.

BACKGROUND

Dragline excavating systems are commonly employed in mining and earth moving operations. Examples of dragline excavating systems are disclosed in U.S. Pat. No. 4,791,738 to Briscoe, U.S. Pat. No. 5,084,990 to Briscoe, and U.S. Pat. No. 5,992,061 to Fleck, et al. In general, a dragline excavating system includes a dragline bucket that engages the ground and collects dirt, rocks, and other debris from the ground. A pair of hoist chains are secured to opposite sides of the dragline bucket and extend upward to join with hoist ropes that effectively support the dragline bucket and control the vertical position of the bucket. A pair of dump ropes are also secured to the dragline bucket to control the orientation (i.e., tilt or angle) of the dragline bucket in relation to the ground. In addition, a pair of drag chains are secured to a front of the dragline bucket and are joined with drag ropes to control a horizontal, dragging movement of the bucket.

As the dragline excavating system is utilized, the dirt, rocks, and other debris may abrade the dragline bucket and the rigging as they contact or slide against the ground. Connections between the various elements may also experience wear in areas where surfaces of the elements bear against each other and are subjected to tensile, compressive, abrasive, or various other forces Following a period of use, therefore, portions of the dragline excavating system are subjected to maintenance to permit worn or otherwise damaged elements to be inspected, repaired, or replaced.

Connections between some of the elements of the dragline excavating system are pinned connections that permit two joined elements to rotate relative to each other. In general, a pinned connection includes a pin that extends through two connection elements (i.e., the elements that are joined by the pin) to effectively join the connection elements together. Many pinned connections incorporate bushings that extend around and contact surfaces of the pin. In order to install the bushings, apertures that receive the bushings are commonly heated to expand the inner diameters of the apertures, while the bushings are cooled (e.g., with dry ice) to contract the outer diameters of the bushings. The bushings are then pressed into the apertures. The bushings may alternatively be welded in the aperture to secure the bushings. Following installation of the bushings, the pin is inserted into the connection to set within the bushings. With floating pins, plates or other elements are welded over the outer ends of the apertures to prevent the pin from being removed or ejected from the joined elements. Fixed pins would include a head and a nut or other securing means to hold the pin in the connection.

Mining and earth moving machines are halted during periods of maintenance, which has a limiting effect upon the overall efficiency of the machine. In order to inspect, repair, or replace pinned connections, it is common for the welded plates to be removed to provide access to the pin and bushings, which involves cutting at least one of the plates with a welding torch. In addition, maintenance may include separating the pin and/or bushings from the joined elements, which involves cutting the bushings with the welding torch. During use of a dragline excavating system, fines (i.e., relatively small particles or dust) from the dirt, rocks, and other debris may become compacted or otherwise lodged into the pinned connections, which hinders separation of the pin and bushings after the plates are removed. Furthermore, misalignment within the pinned connection that results from installation or wear during use may also hinder separation of the pin and bushings. Given the presence of these fines and the potential misalignment, hammering may be used to separate the pin and bushings from the joined elements. In addition to the time consumed by both the installation and maintenance processes, repeatedly welding, cutting, and hammering may pose risks to personnel and degrade or otherwise damage the joined elements. Accordingly, elements of the dragline excavating system that may be quickly maintained (i.e., inspected, disassembled, and repaired) without welding and hammering operations may enhance the overall efficiency of the dragline excavating system.

SUMMARY

Various aspects of the invention pertain to pinned connections that join two elements together. The pinned connections are suited for use in excavating equipment, but may nevertheless be used in a variety of environments, including a wide range of mining, dredging, forestry, and construction equipment.

In one aspect of the invention, a pinned connection is mechanically-secured and adapted for installation and removal without the need for welding or hammering. The pinned connection can be installed and removed on site in an easy and quick manner so as to reduce the difficulty and time typically needed to exchange a worn component with a new replacement. This is a particular advantage when the coupling arrangement is used to secure elements in large excavating equipment where equipment downtime translates into a significant economic loss. Further, by eliminating the need for welding and hammering, the pinned connection reduces the risk to which users have ordinarily been exposed in replacing elements in excavating equipment.

In another aspect, various elements of the pinned connections have threaded and frustroconical configurations that separate with relatively small rotations and also separate when fines are compacted between the elements. A pin may also have one or more ends with frustroconical configurations that separate from other elements and align with the other element relatively easily.

In one embodiment, a pinned connection includes a first connection element, a second connection element, a pin, and an insert. The first connection element defines an aperture, and at least a portion of the aperture is threaded. The second connection element defines a hole. The pin extends into the aperture and the hole. The insert is located within the aperture and adapted to contact the pin. At least a portion of the insert has a threaded surface that engages the threaded surface of the aperture. In some configurations of this embodiment, the threaded surfaces of the aperture and the insert may have corresponding frustroconical configurations.

In another embodiment, a connection system for a pinned connection includes a connection element, a pair of inserts, and a pin. The connection element has a pair of spaced arms that each define an aperture, at least a portion of each aperture having a frustroconical configuration with threads. At least a portion of each insert has a frustroconical configuration with threads, each insert being located in one of the apertures, and the threads of each insert engaging the threads of one of the apertures. In addition, the pin contacts each of the inserts and extends between the arms.

In yet another embodiment, a dragline excavating system has a plurality of components joined through pinned connections. At least one of the pinned connections includes a first connection element, a second connection element, a pin, and an insert. The first connection element defines an aperture, and at least a portion of the aperture is threaded. The second connection element defines a hole. The pin extends into the aperture and the hole. The insert is located within the aperture and adapted to contact the pin. At least a portion of the insert has a threaded surface that engages the threaded surface of the aperture.

In any of these embodiments, locks may be used to secure the inserts within the apertures. In any of these embodiments, separate bushings may be used, or the bushings may be incorporated into the inserts.

To gain an improved understanding of the advantages and features of novelty, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

Figure 6:
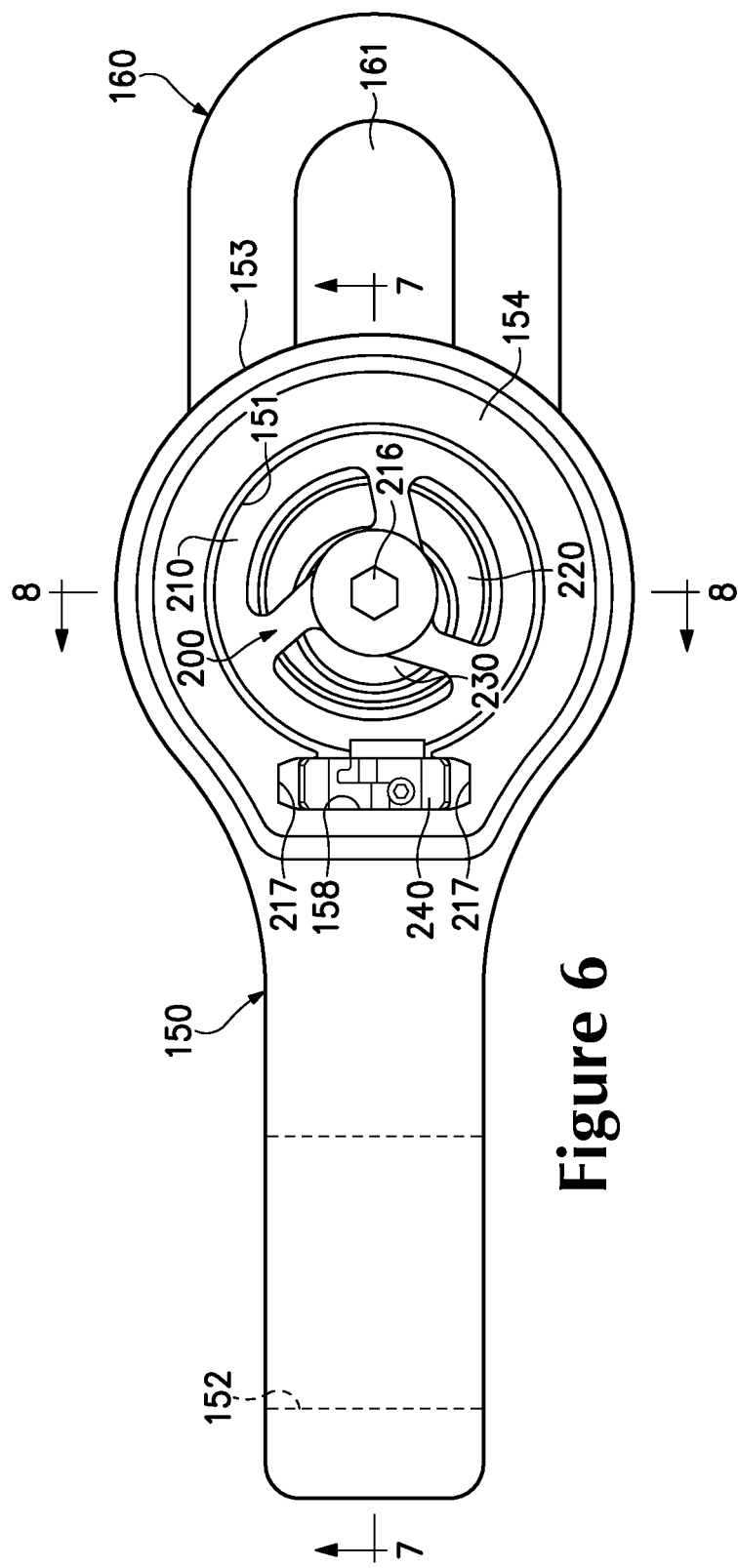
FIG. 6 is a side elevational view of the first connection system.
Figure 7:
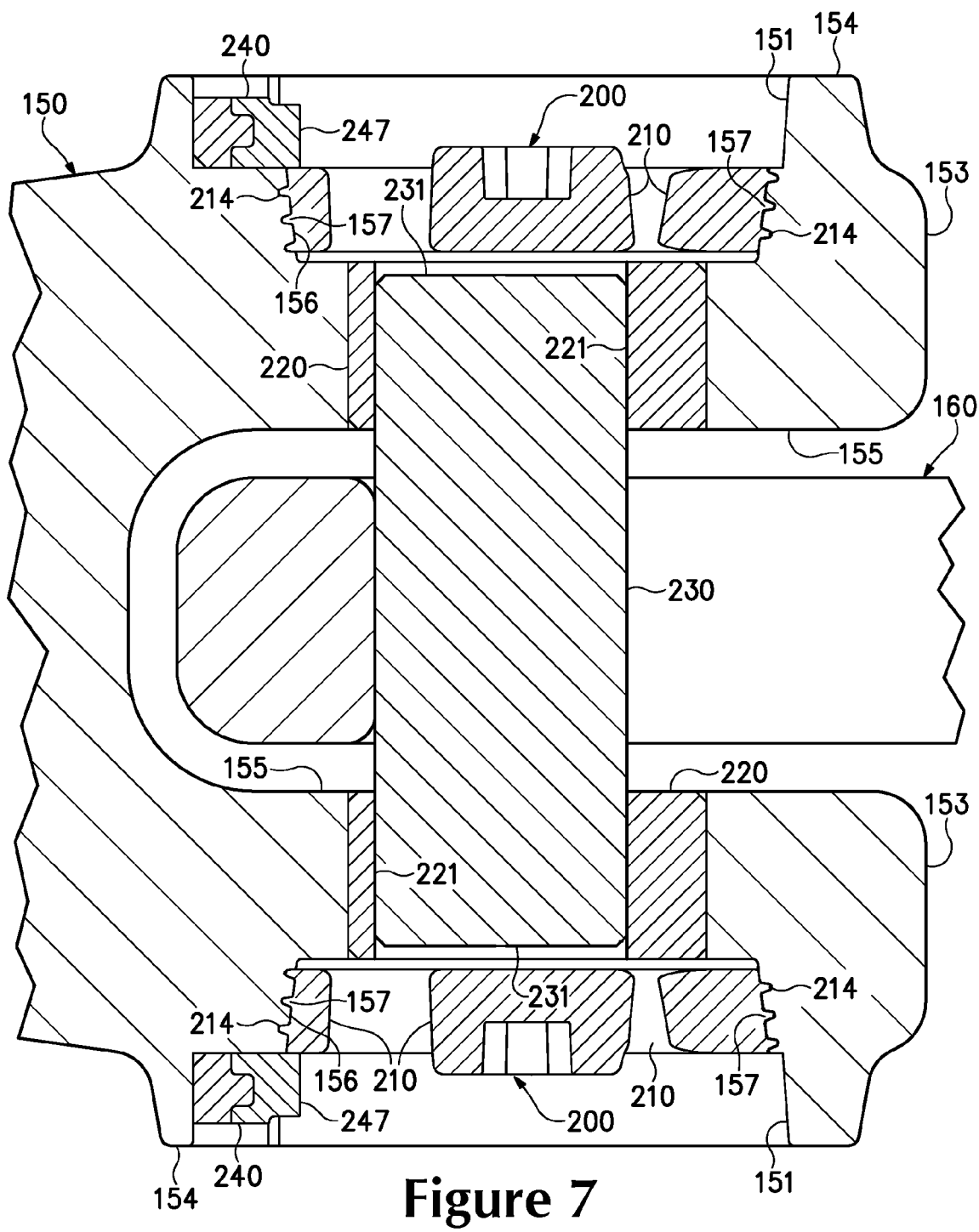
Figure 8:
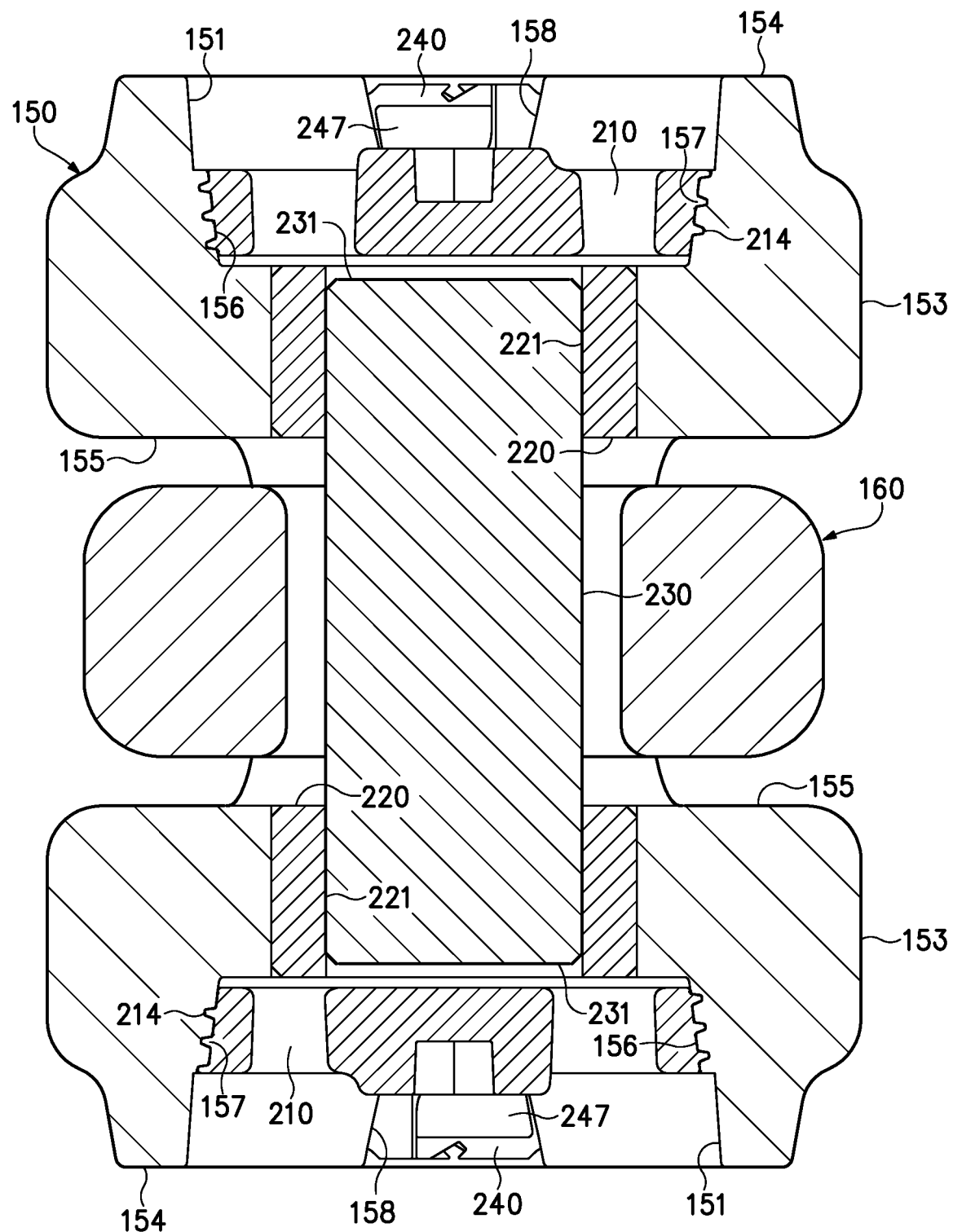

FIGS. 7 and 8 are cross-sectional views of the first connection system, as respectively defined by section lines 7 and 8 in FIG. 6.

Figure 9:
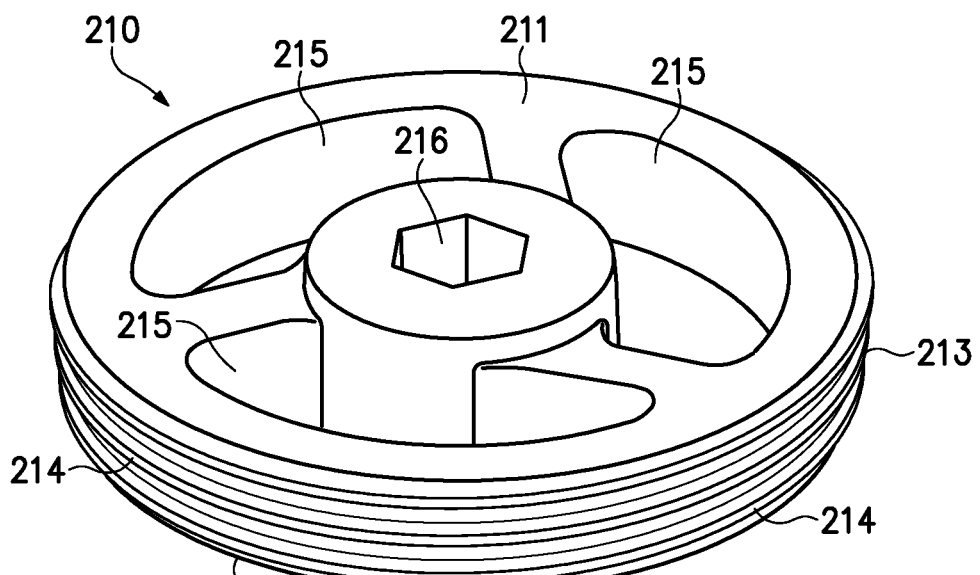
Figure 10:
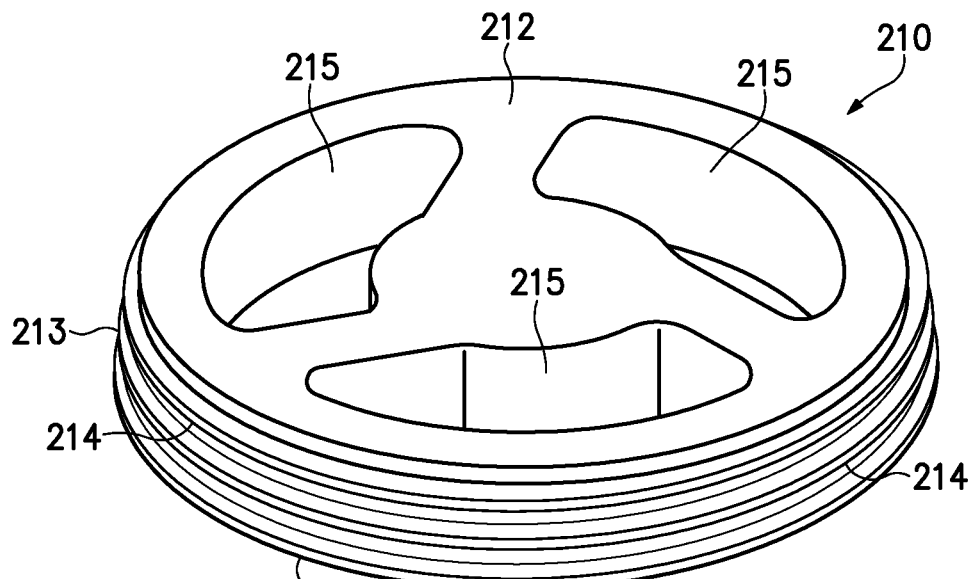

FIGS. 9 and 10 are perspective views of a retainer of the first connection system.

Figure 11:
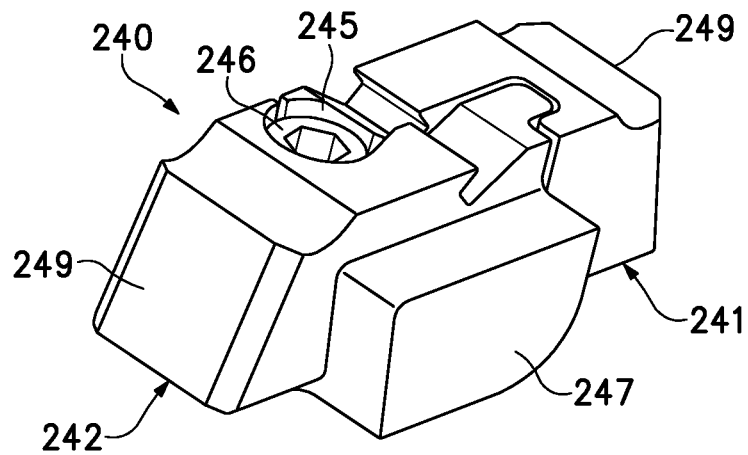

FIG. 11 is a perspective view of a lock of the first connection system.

Figure 12:
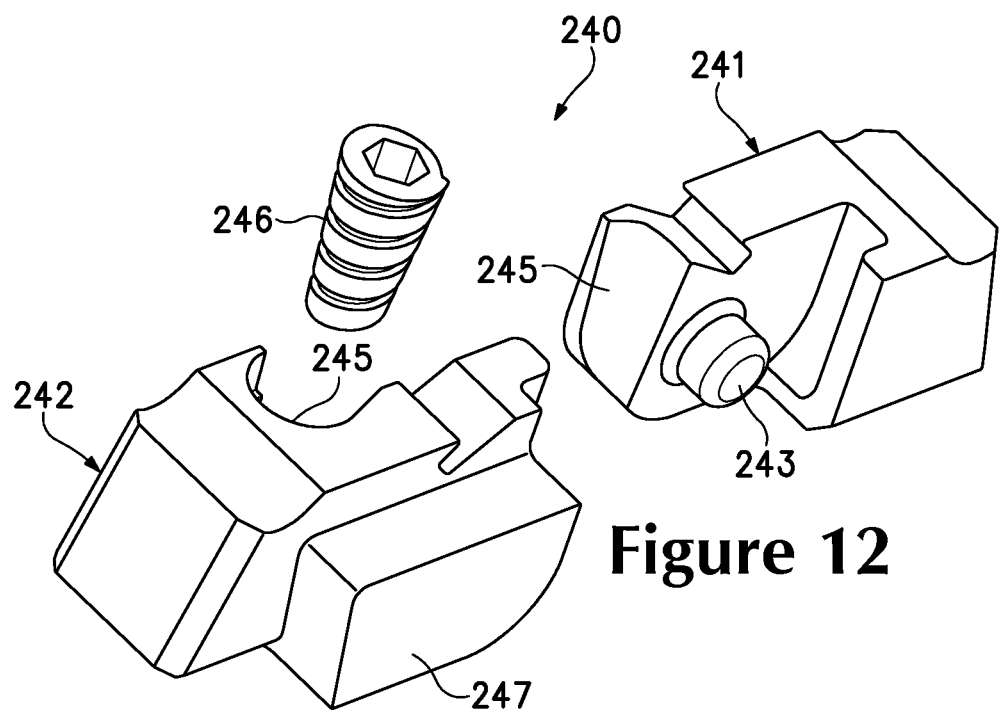
Figure 13:
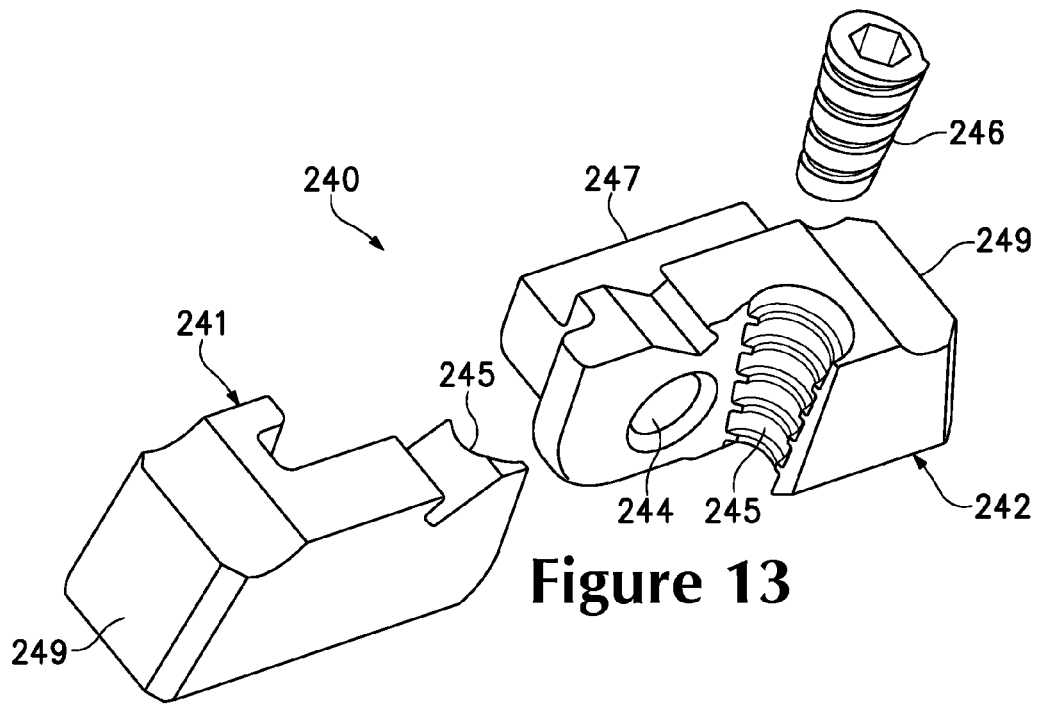

FIGS. 12 and 13 are exploded perspective views of the lock.

Figure 14:
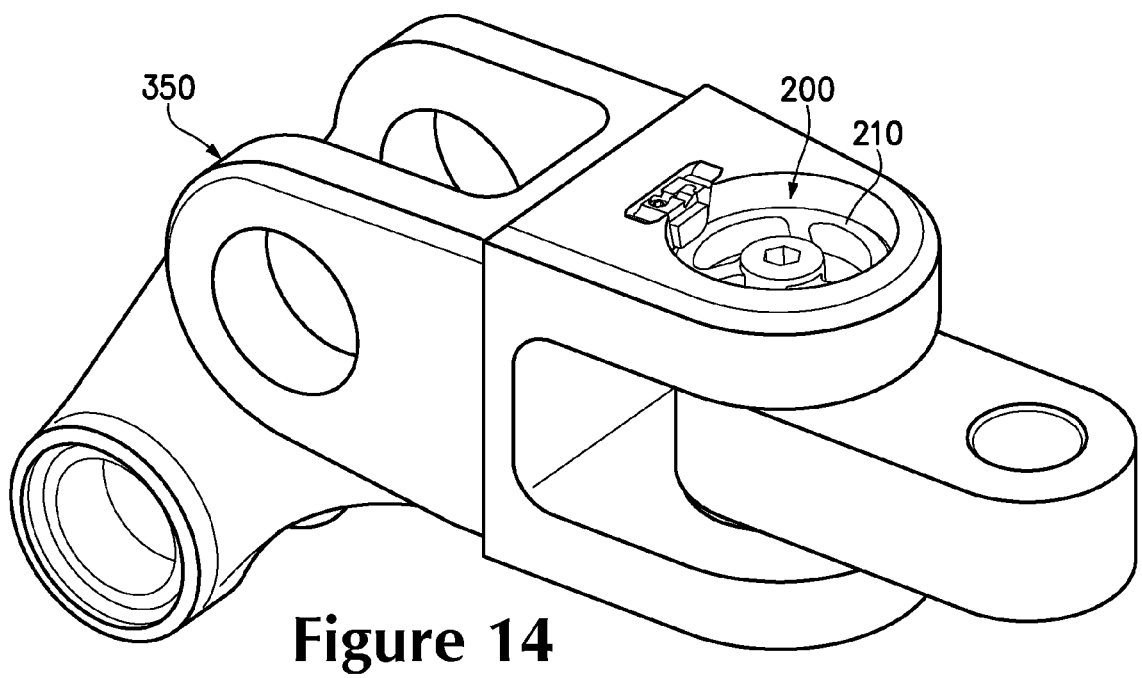

FIG. 14 is a perspective view of the first connection system joining a second pair of connection elements.

Figure 15:
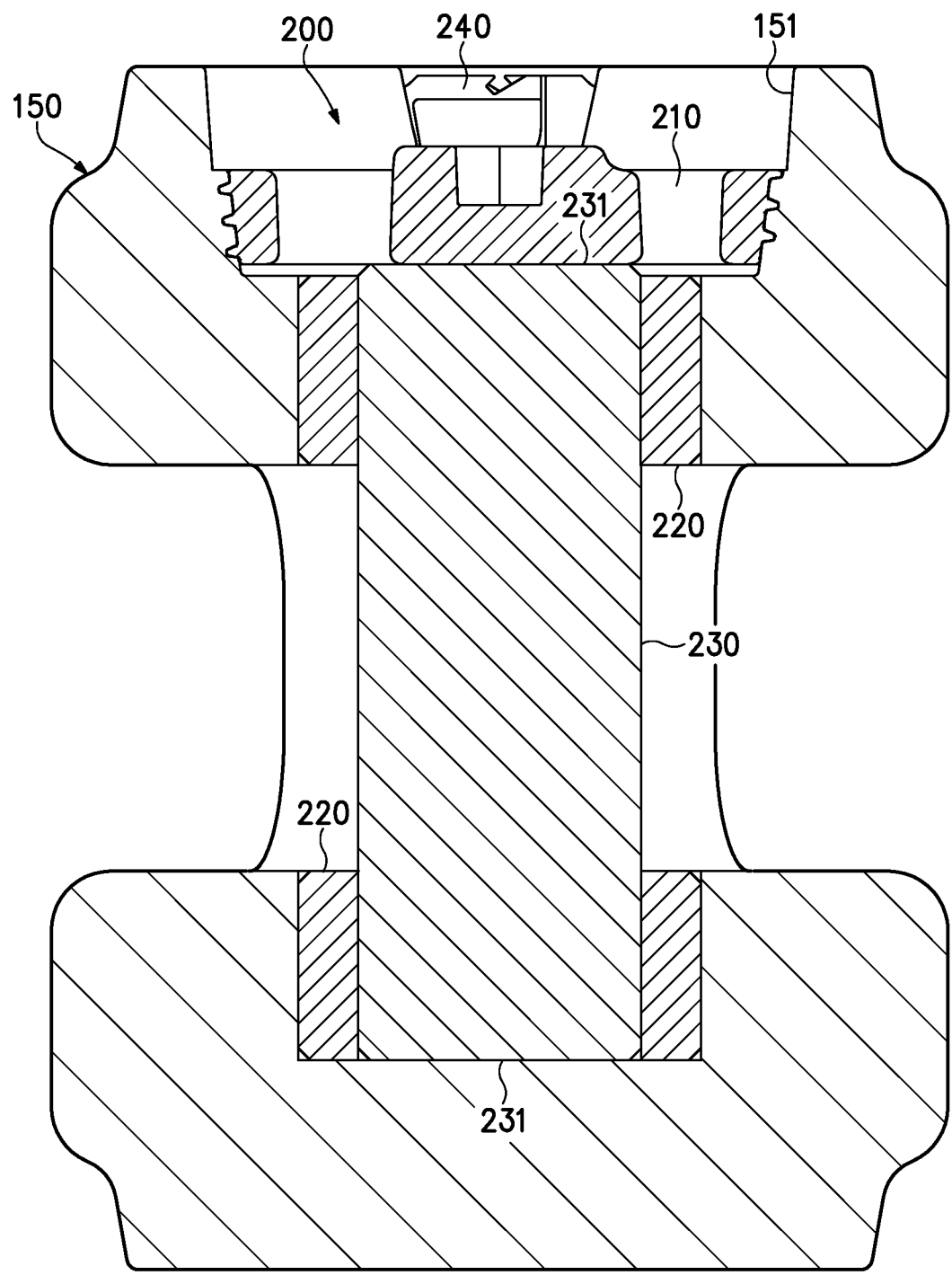
Figure 16:
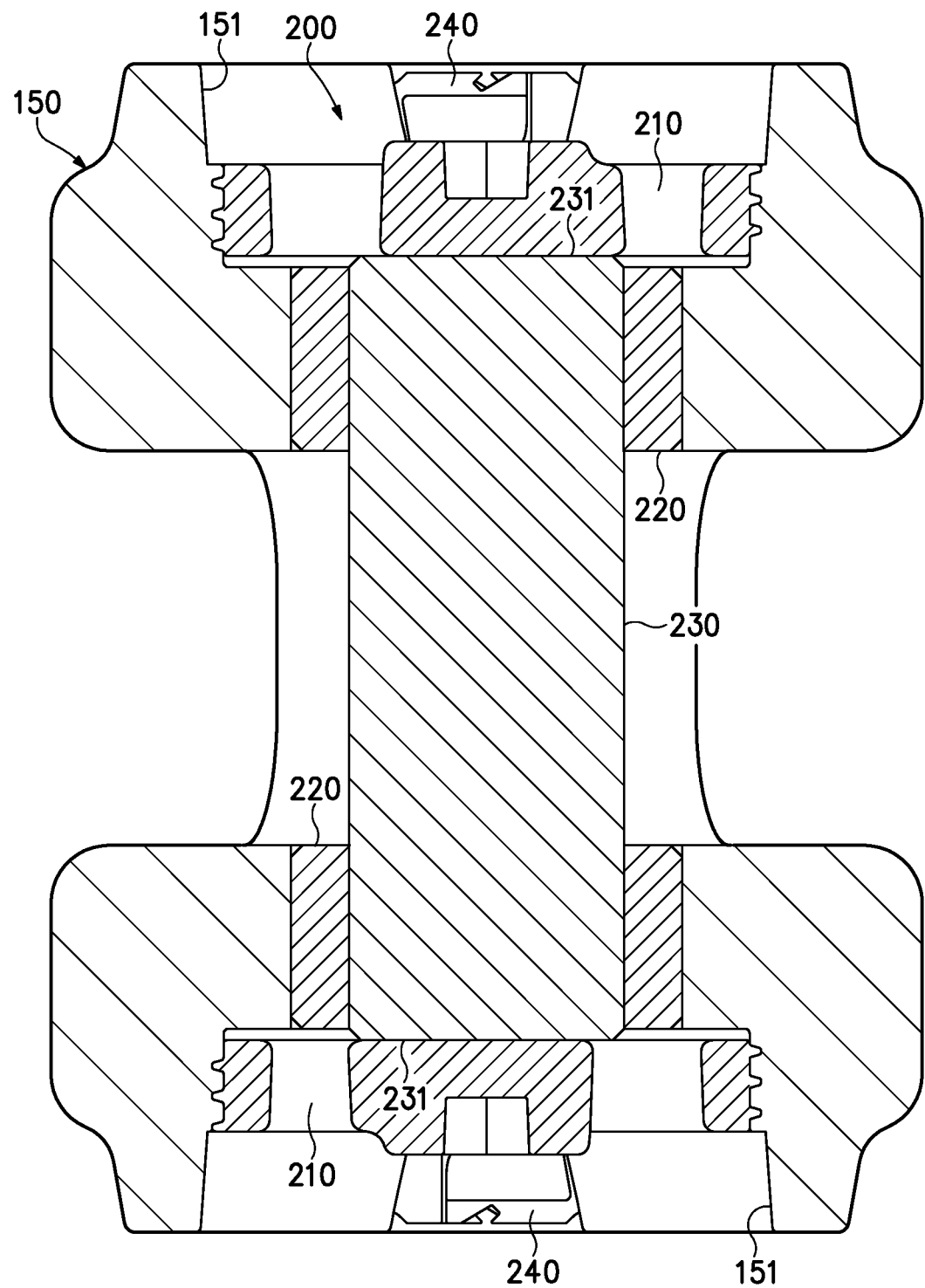

FIGS. 15 and 16 are cross-sectional views corresponding with FIG. 8 and depicting further configurations of the first connection system.

Figure 17:
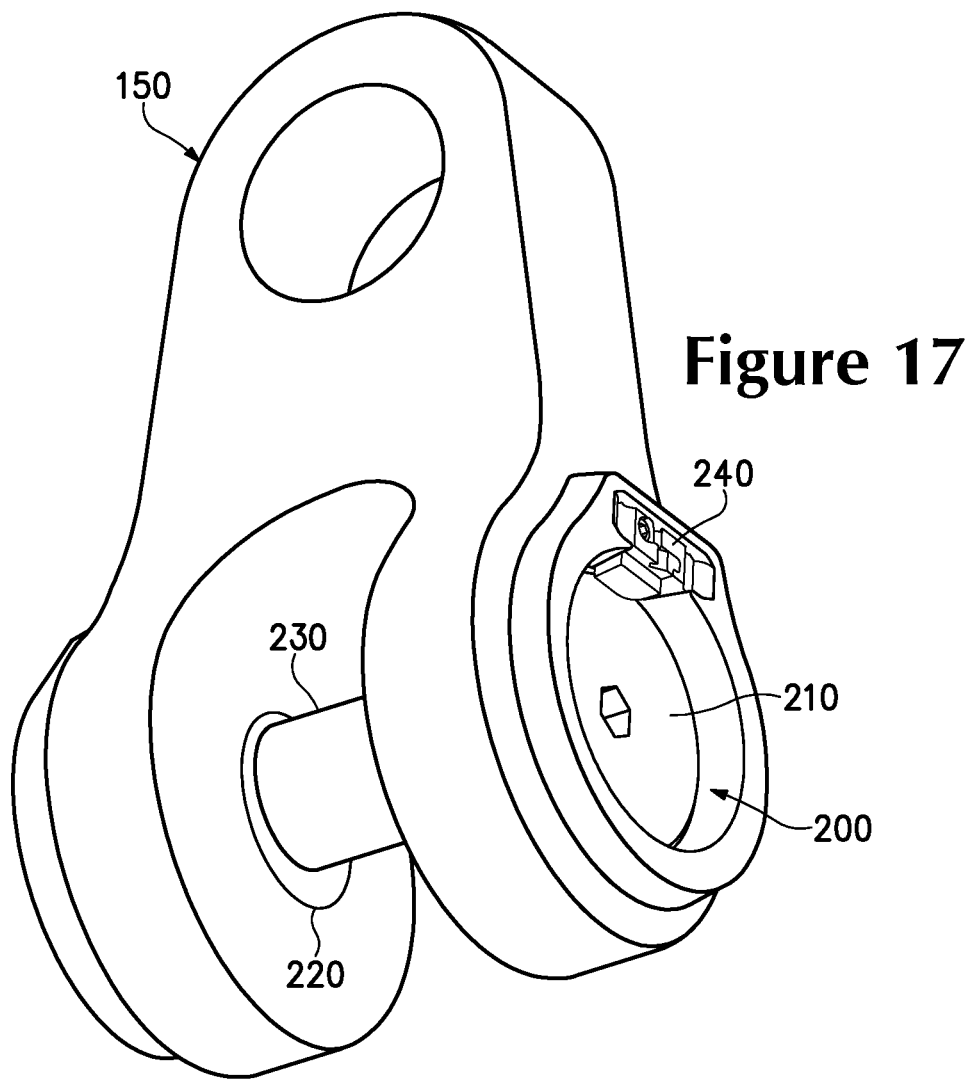

FIG. 17 is a perspective view of a further configuration of the first connection system.

Figure 18:
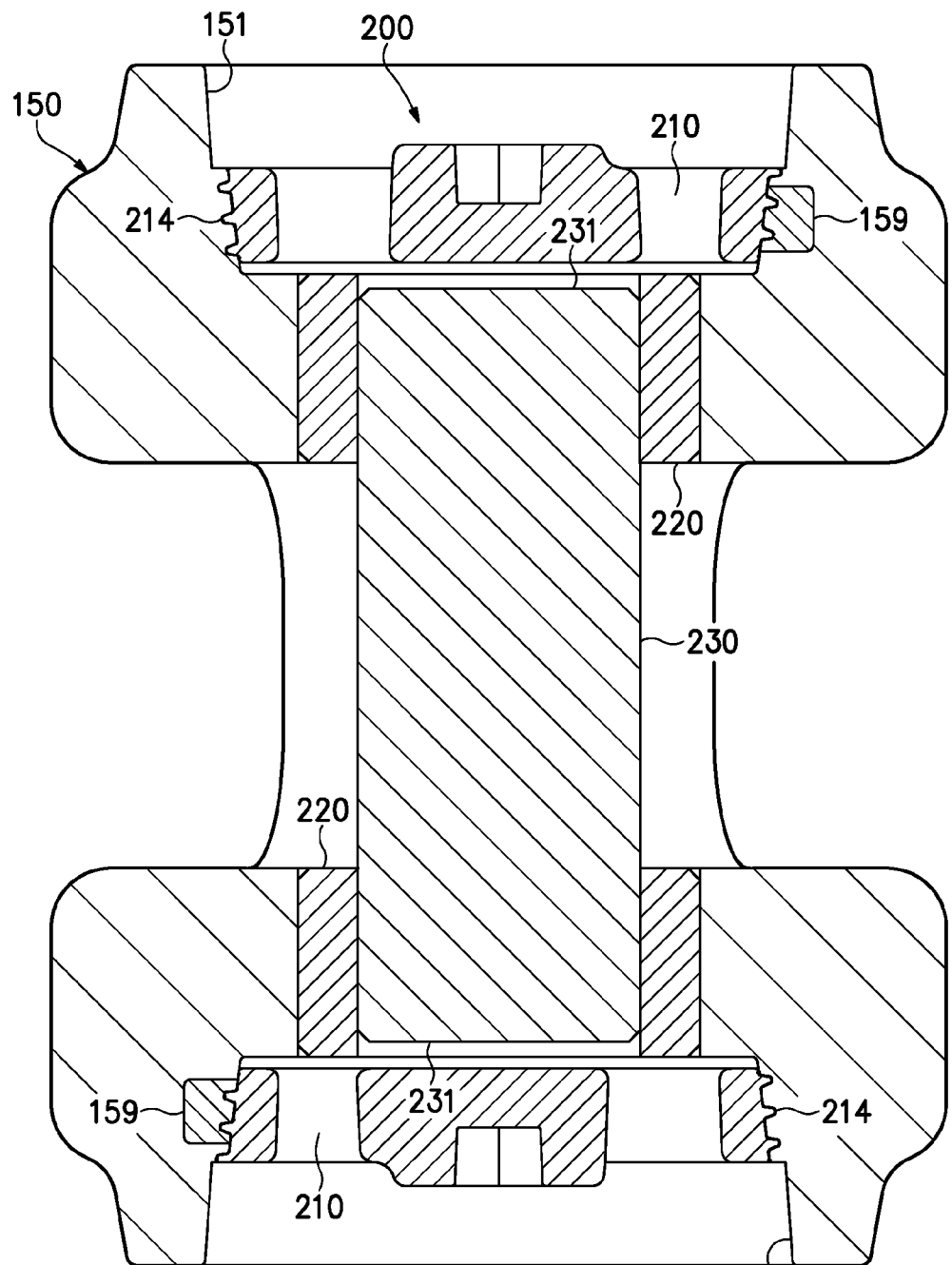
Figure 19:
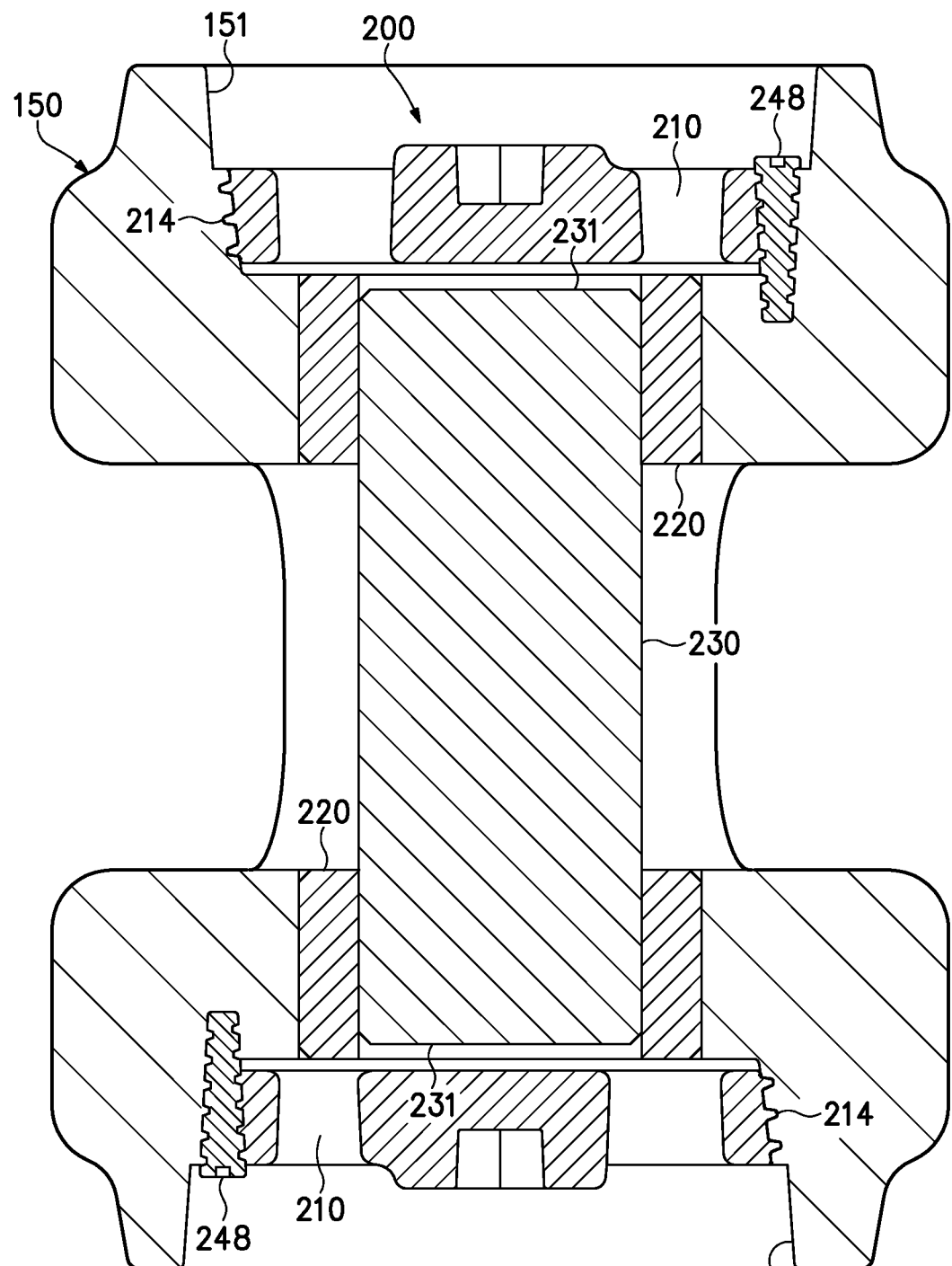
Figure 20:
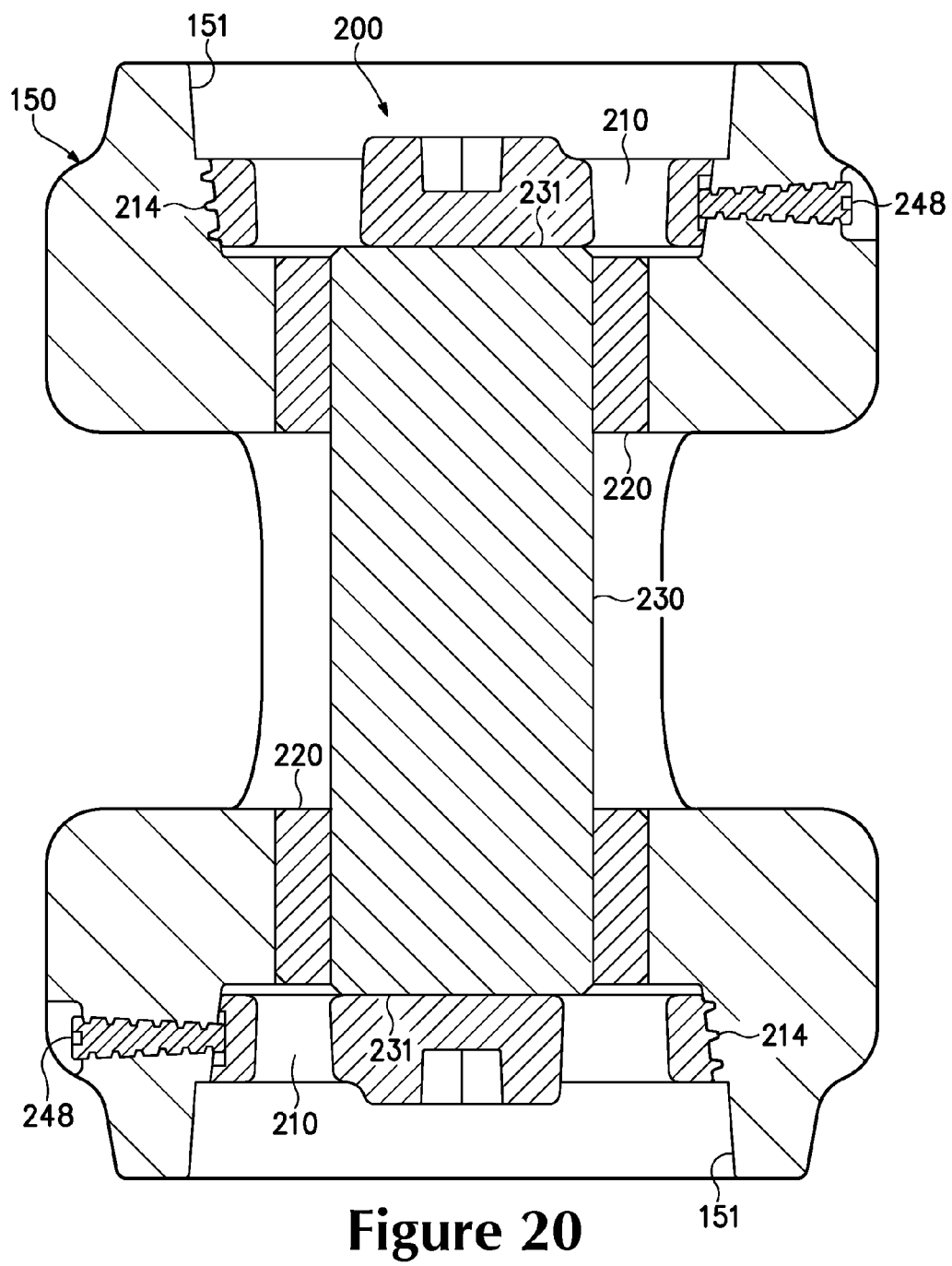

FIGS. 18-20 are cross-sectional views corresponding with FIG. 8 and depicting further lock configurations of the first connection system.

Figure 21:
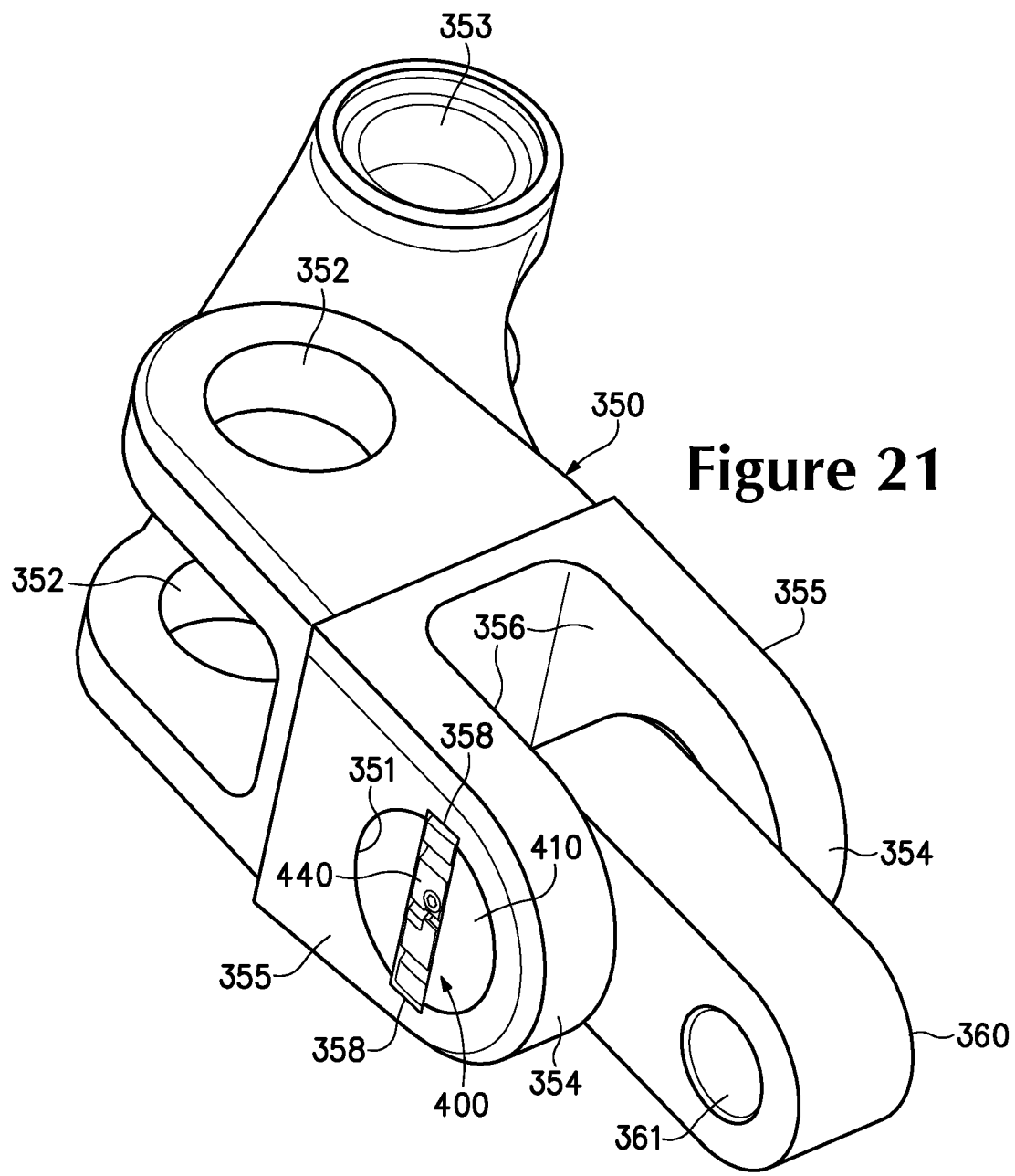

FIG. 21 is perspective view of a second connection system of the dragline excavating system joining the second pair of connection elements.

Figure 22:
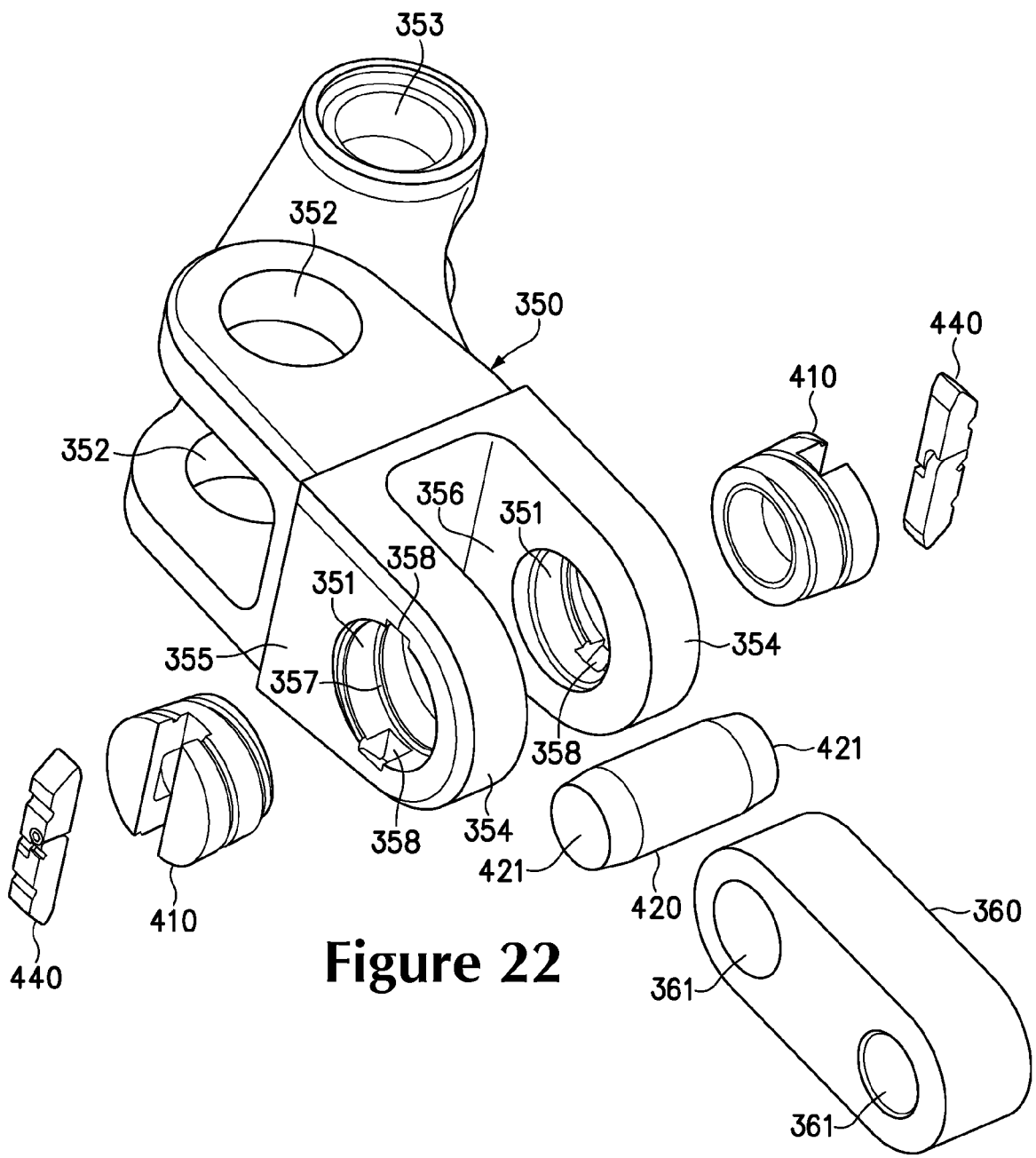

FIG. 22 is an exploded perspective view of the second connection system.

Figure 23:
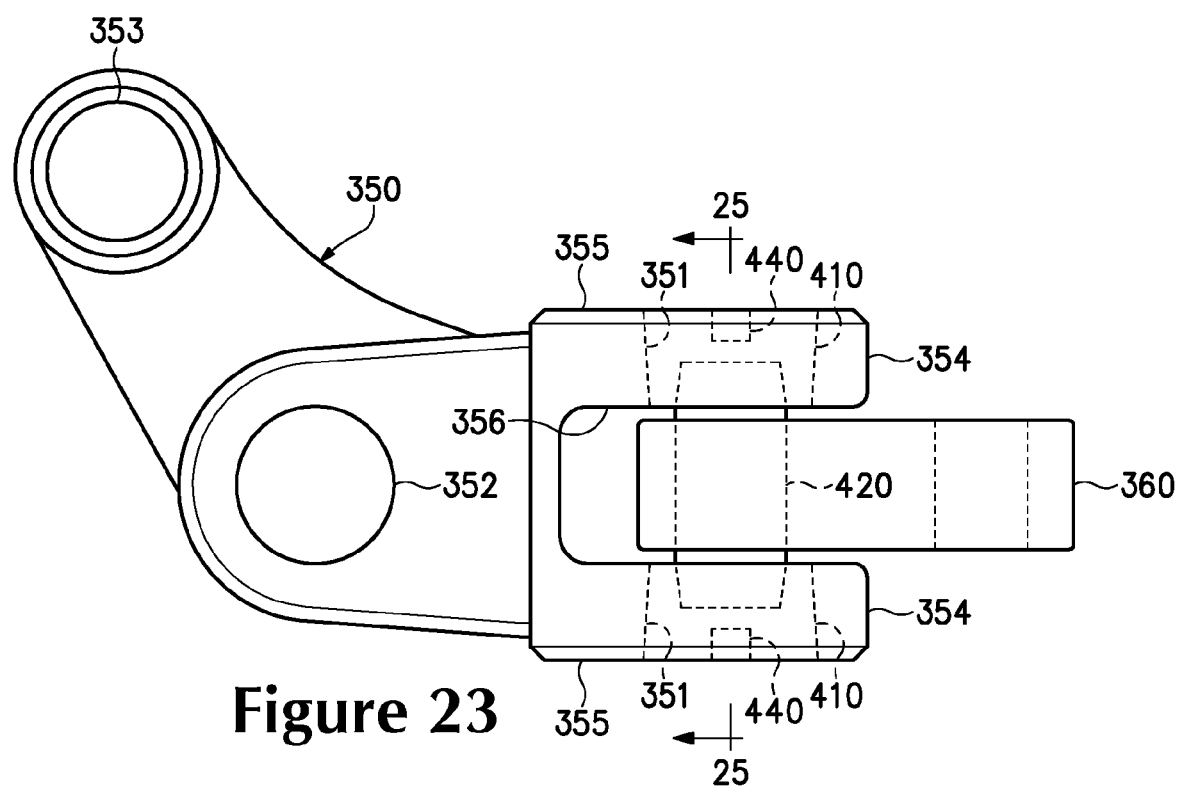

FIG. 23 is a side elevational view of the second connection system.

Figure 24:
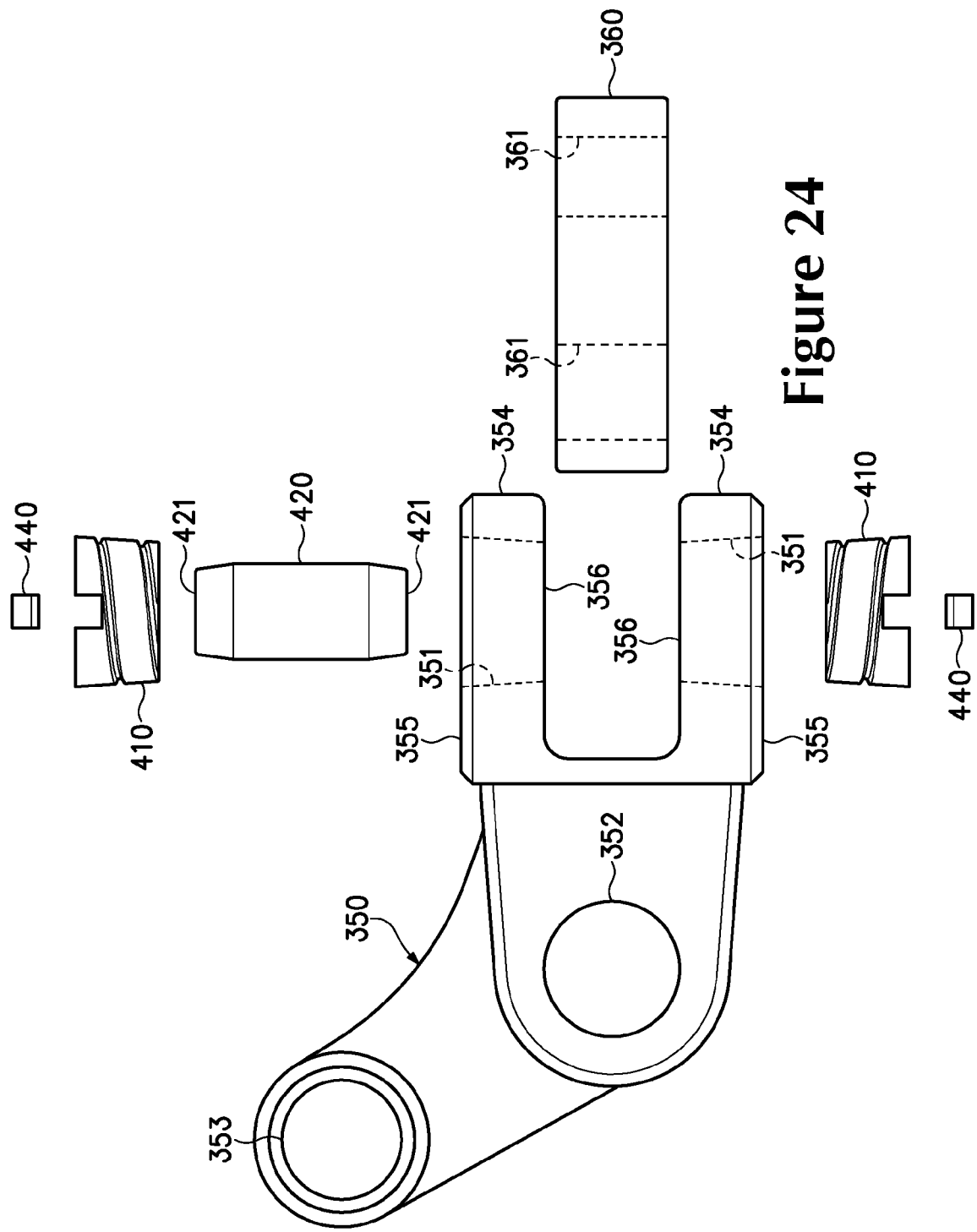

FIG. 24 is an exploded side elevational view of the second connection system.

Figure 25:
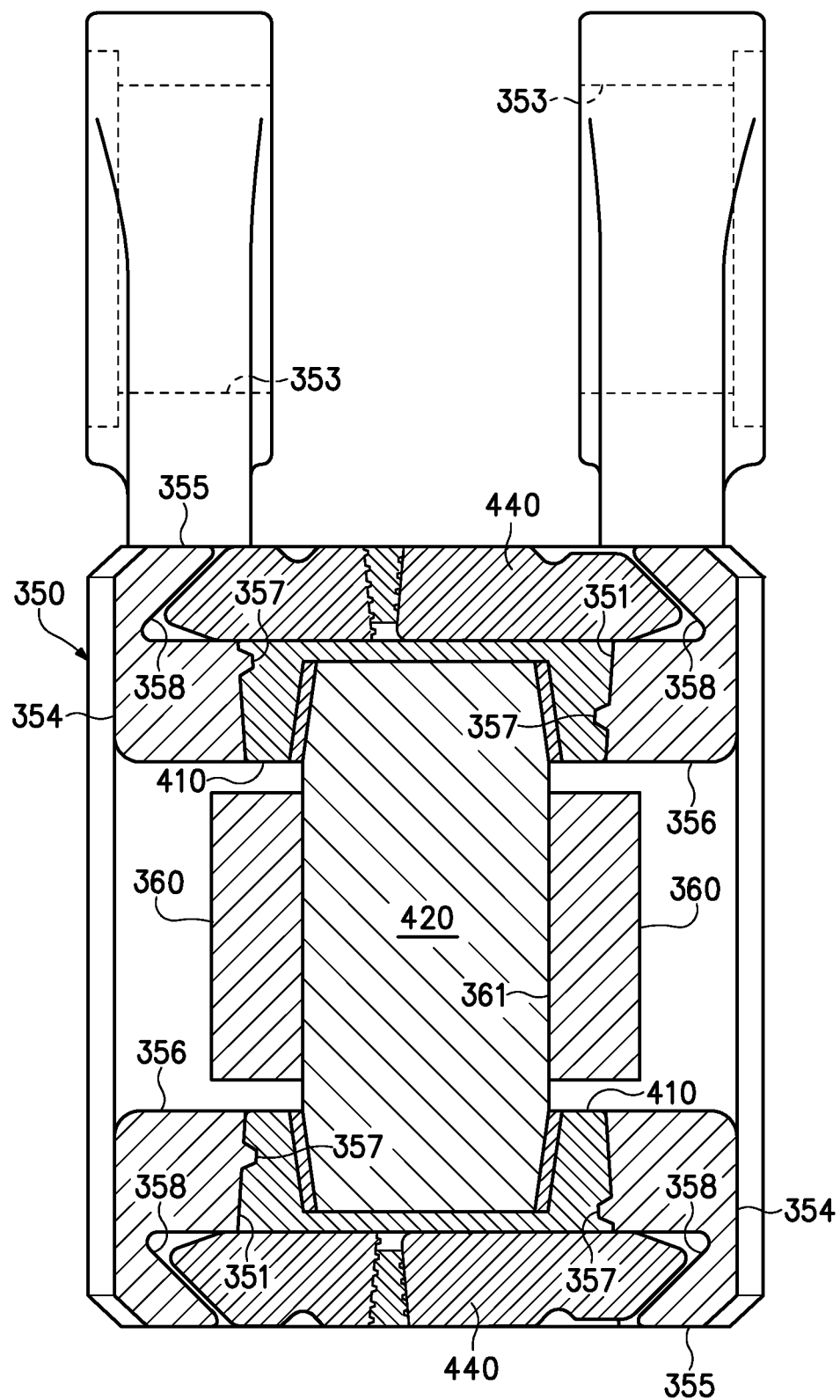

FIG. 25 is a cross-sectional view of the second connection system, as defined by section line 25 in FIG. 23.

Figure 26:
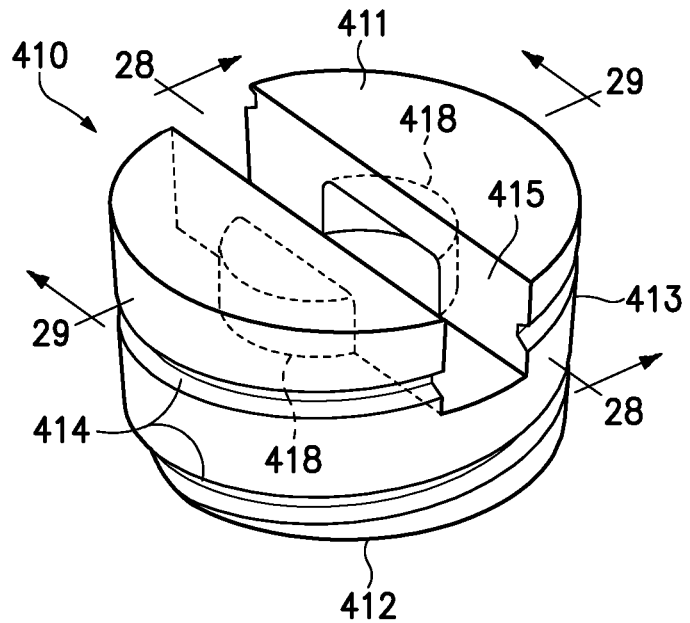
Figure 27:
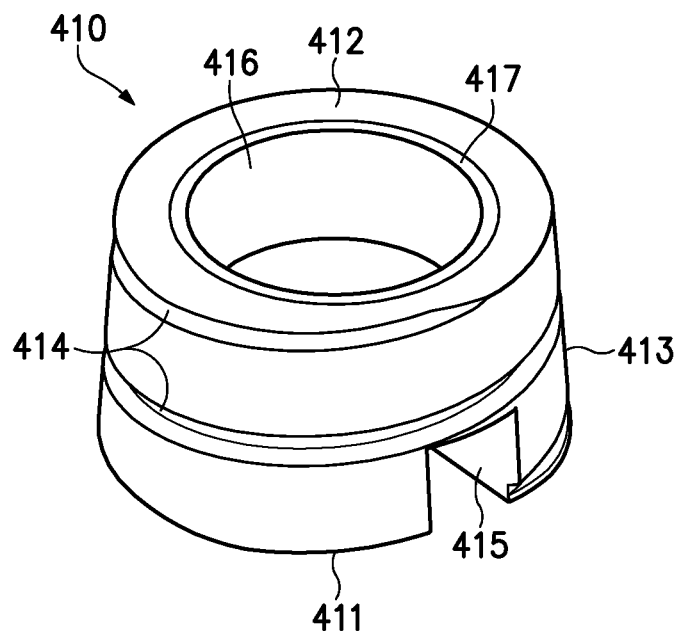

FIGS. 26 and 27 are perspective views of a bushing of the second connection system.

Figure 28:
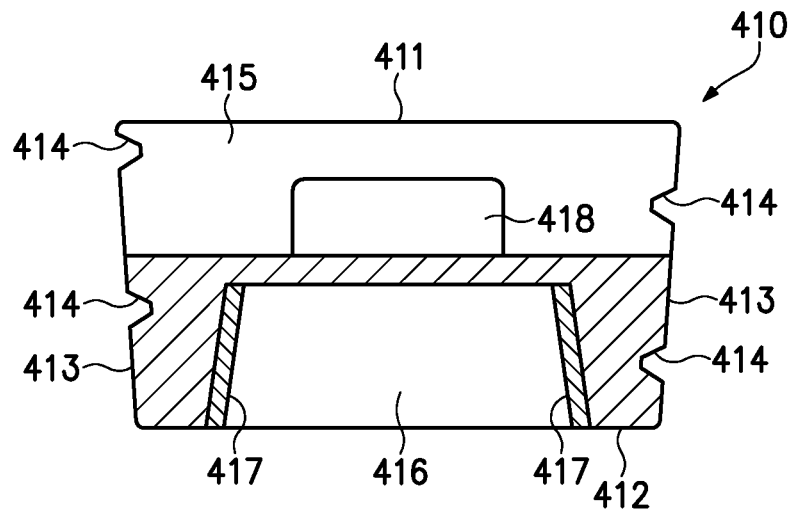
Figure 29:
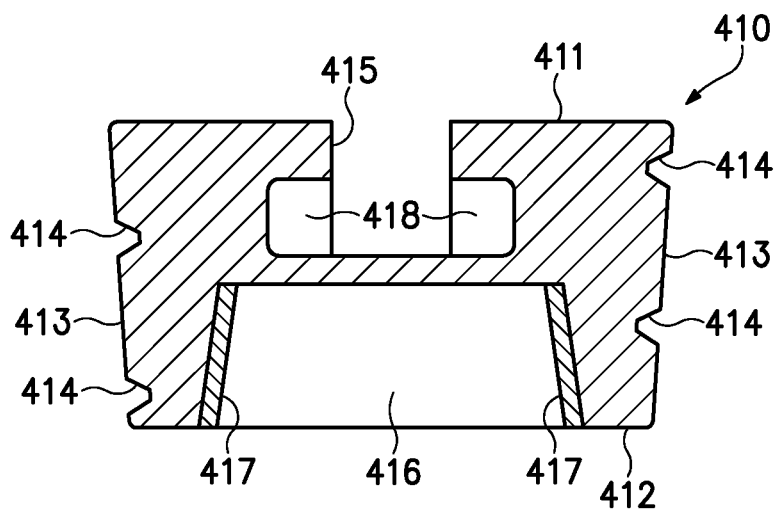

FIGS. 28 and 29 are cross-sectional views of the bushing, as defined by section lines 28 and 29 in FIG. 26.

Figure 30:
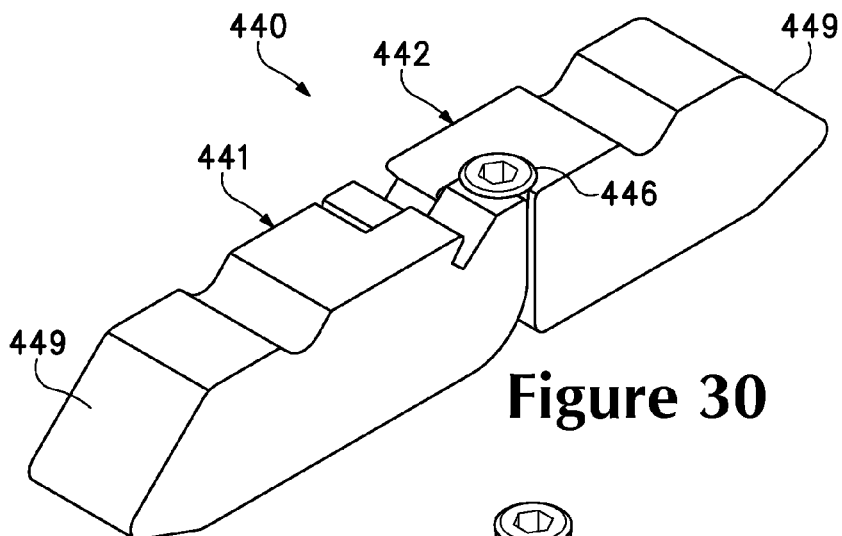

FIG. 30 is a perspective view of a lock of the second connection system.

Figure 31:
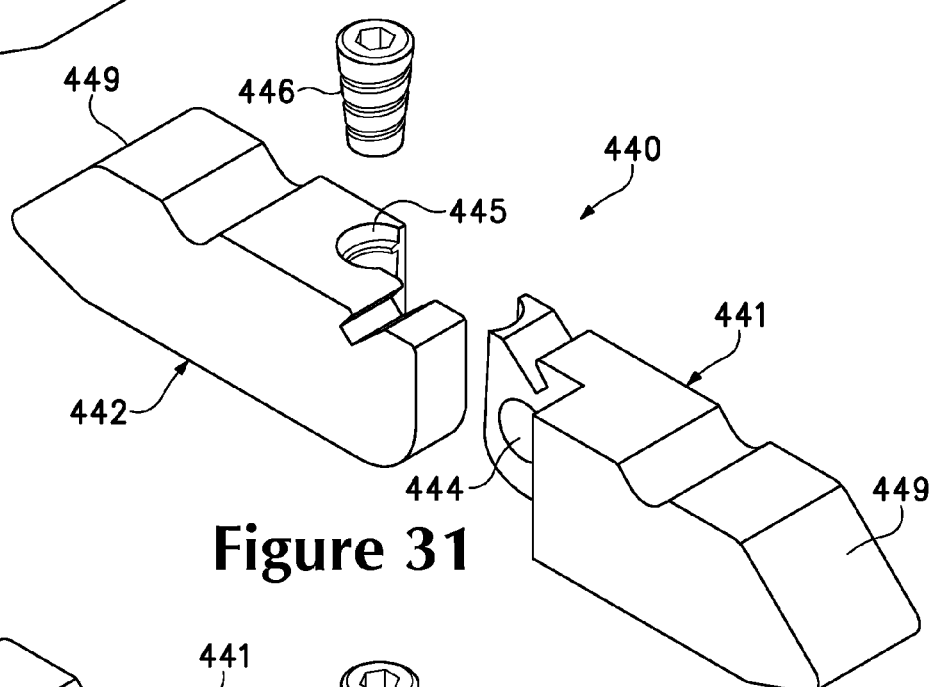
Figure 32:
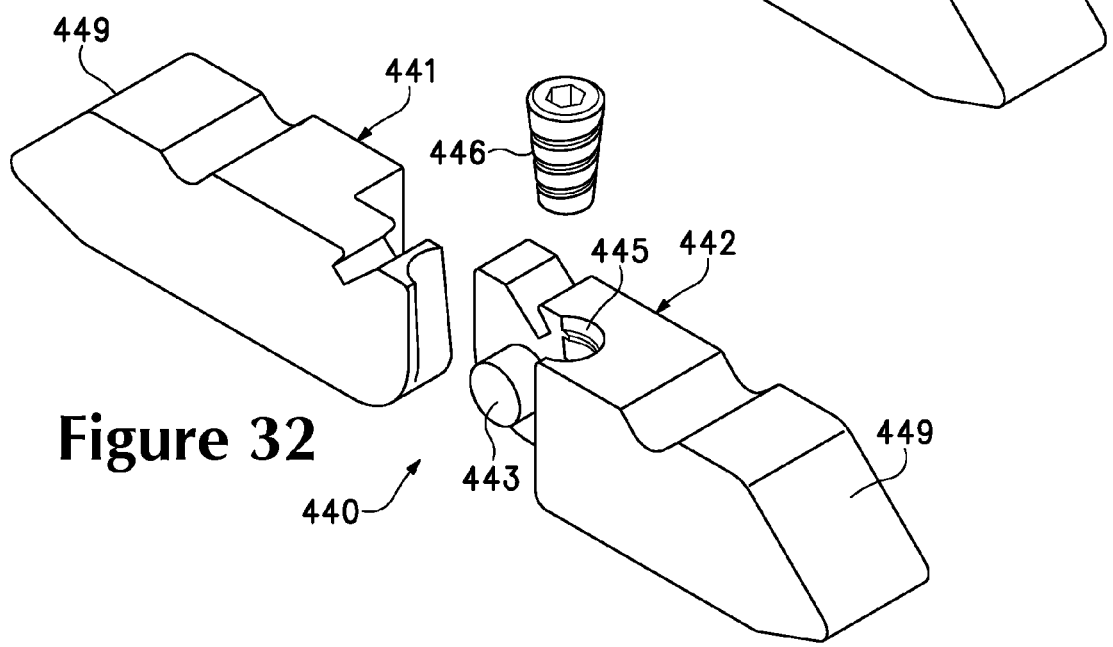

FIGS. 31 and 32 are exploded perspective views of the lock.

Figure 33:
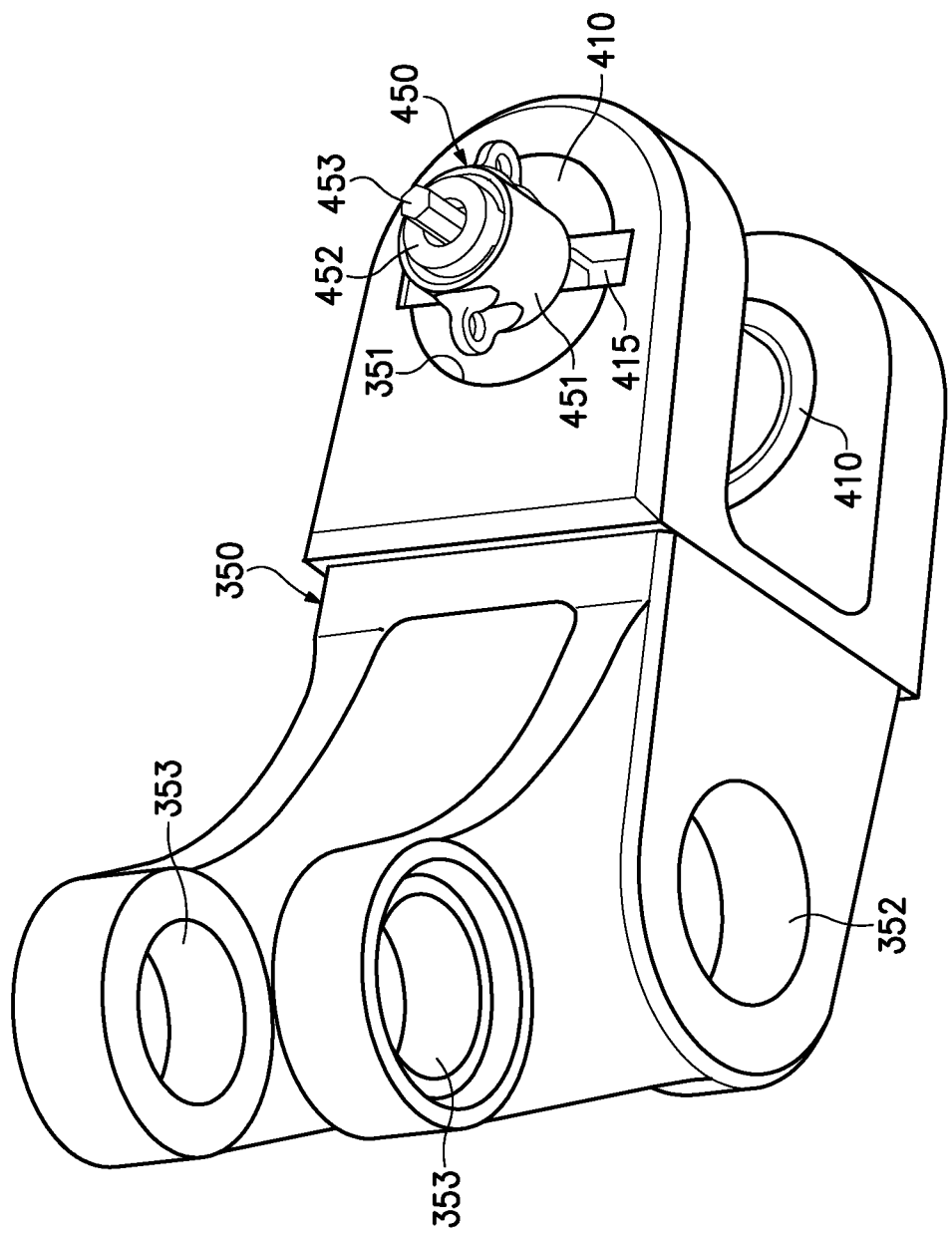

FIG. 33 is a perspective view of the second connection system and a removal apparatus.

Figure 34:
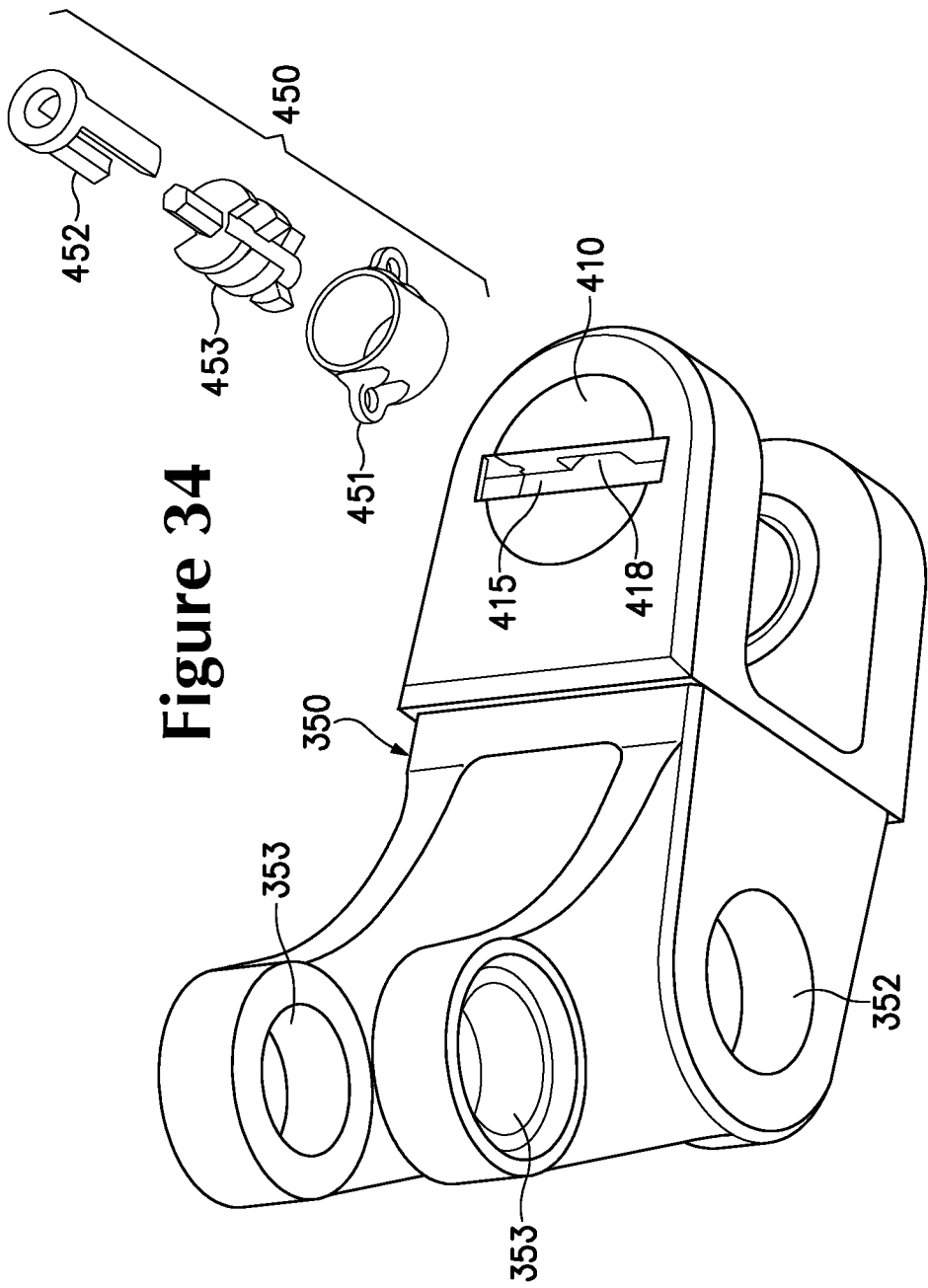

FIG. 34 is an exploded perspective view of the second connection system and the removal apparatus.

Figure 35:
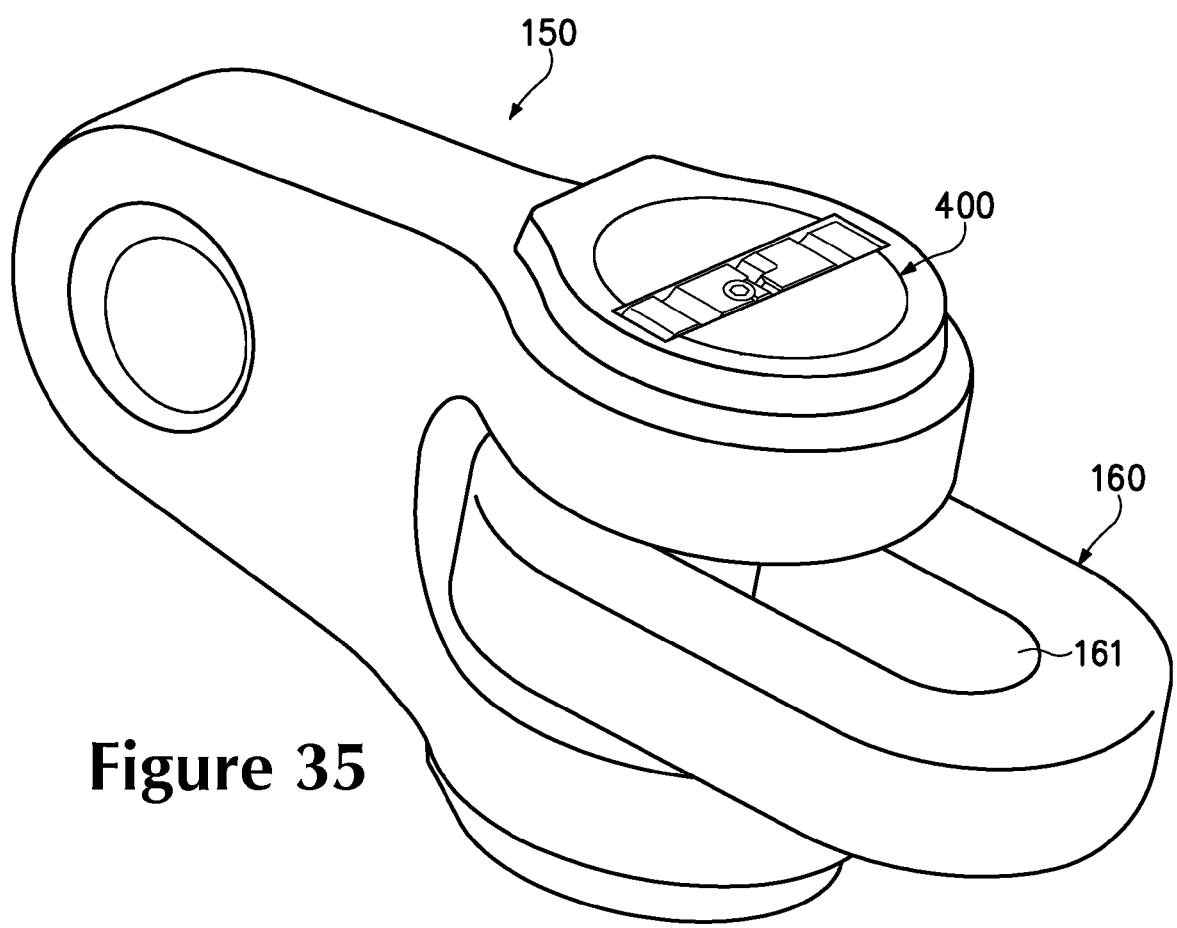

FIG. 35 is a perspective view of the second connection system joining the first pair of connection elements.

FIGS. 36-39 are a cross-sectional views corresponding with FIG. 25 and depicting further configurations of the second connection system.

FIG. 40 is a perspective view of another configuration of the second connection system.

DETAILED DESCRIPTION

The following discussion and accompanying figures disclose various configurations of pinned connections that may be utilized to join two connection elements. Although the pinned connections are disclosed with reference to a dragline excavating system for purposes of example, concepts associated with the pinned connections are not limited to dragline excavating systems and may be utilized in a wide range of mining, dredging, forestry, and construction equipment. The concepts associated with the pinned connections may be utilized, as examples only, with cable shovel connection lugs, clamshell buckets (i.e., at a bucket connection to bucket arms), excavator bucket connections, front-loader bucket lugs, and pinned connections at the ends of hydraulic cylinders. Accordingly, although the pinned connections are described with reference to a dragline excavating system for illustrative purposes, the concepts disclosed herein apply to pinned connections that may be utilized in a variety of applications, whether within the mining industry or within industries that are not associated with mining.

Dragline Excavating System

Figure 1:
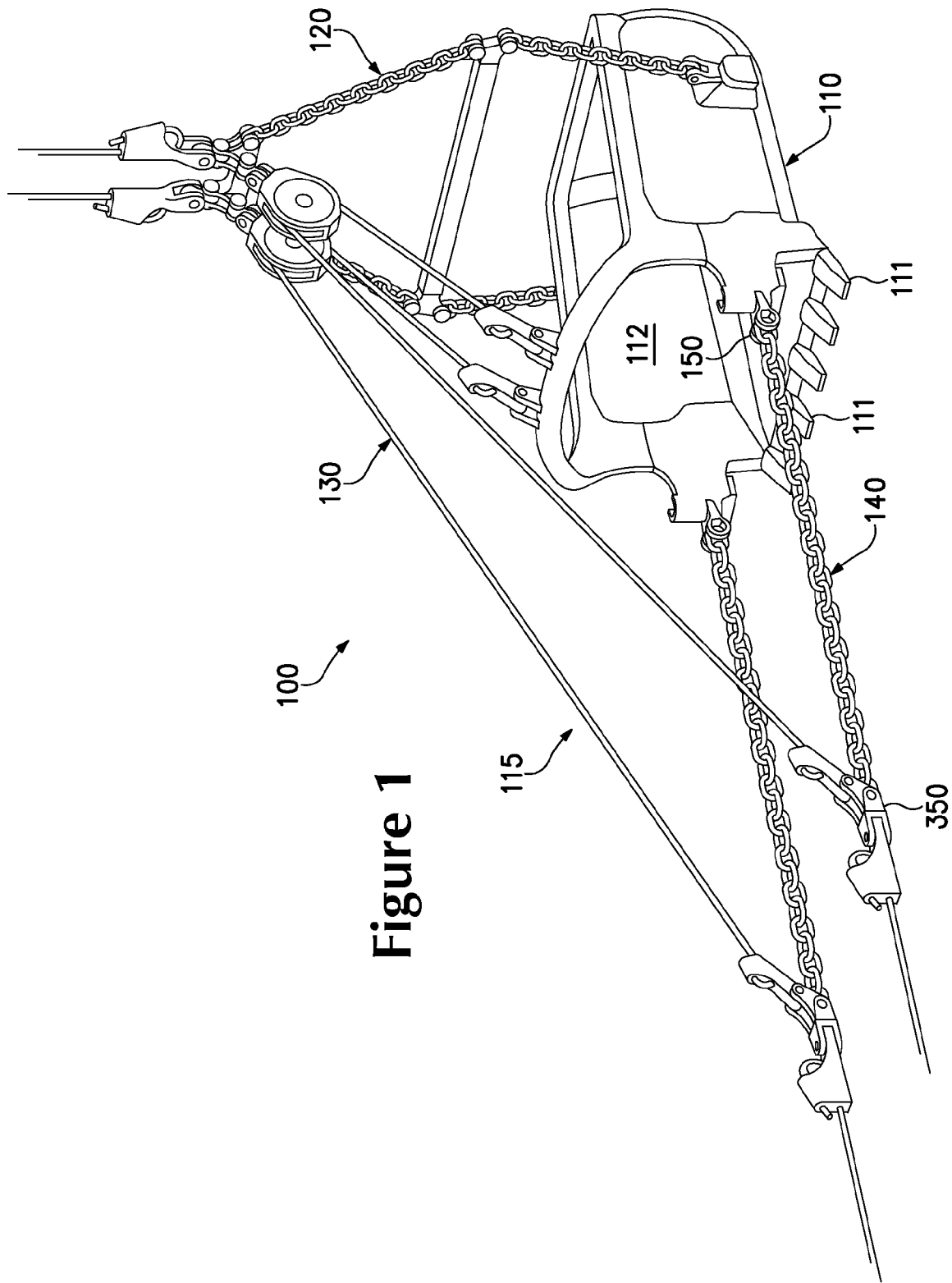
FIG. 1 is perspective view of a portion of a dragline excavating system including a dragline bucket and its rigging.
Figure 2:
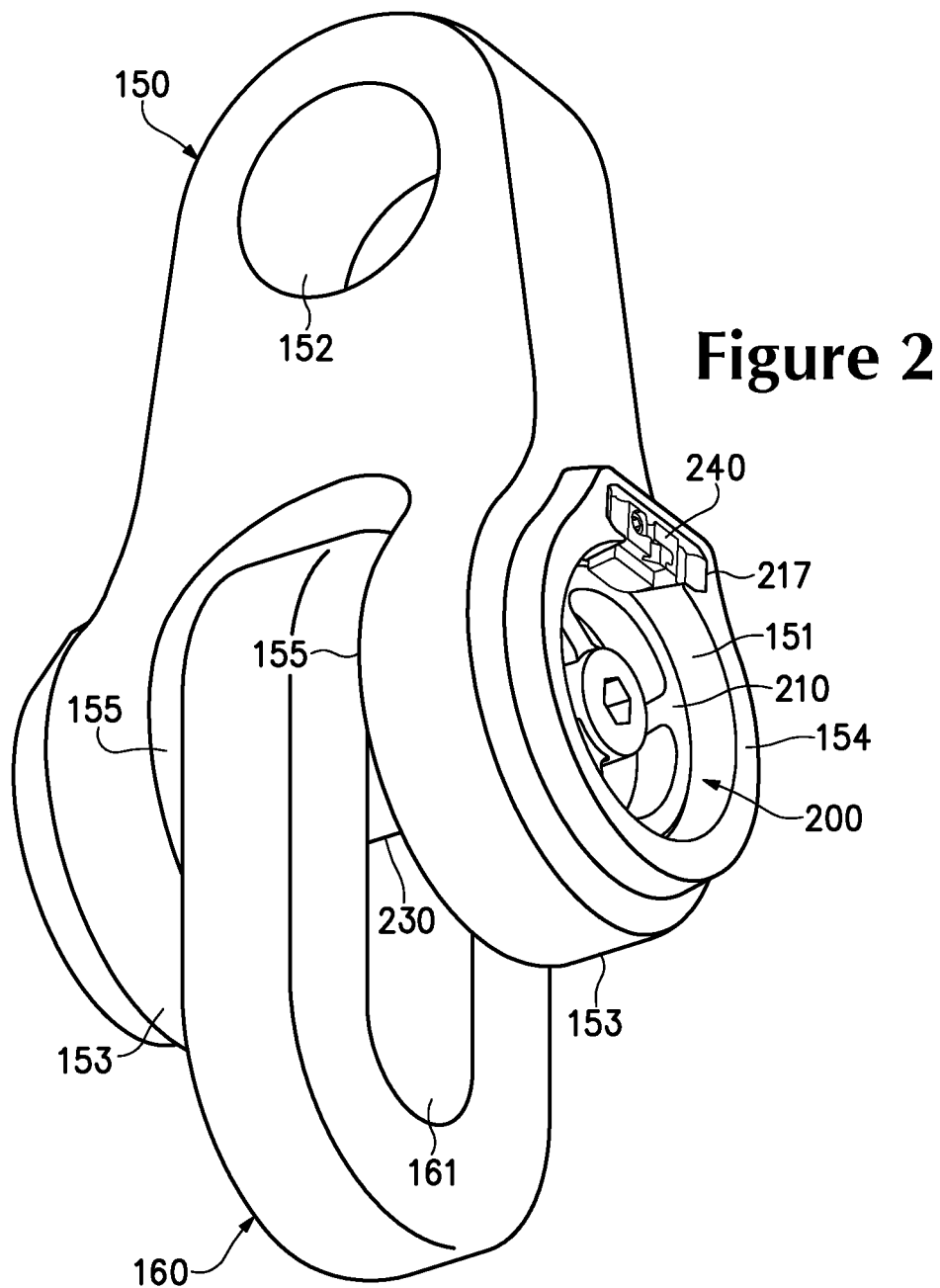
FIG. 2 is perspective view of a first connection system of the dragline excavating system joining a first pair of connection elements.
Figure 3:
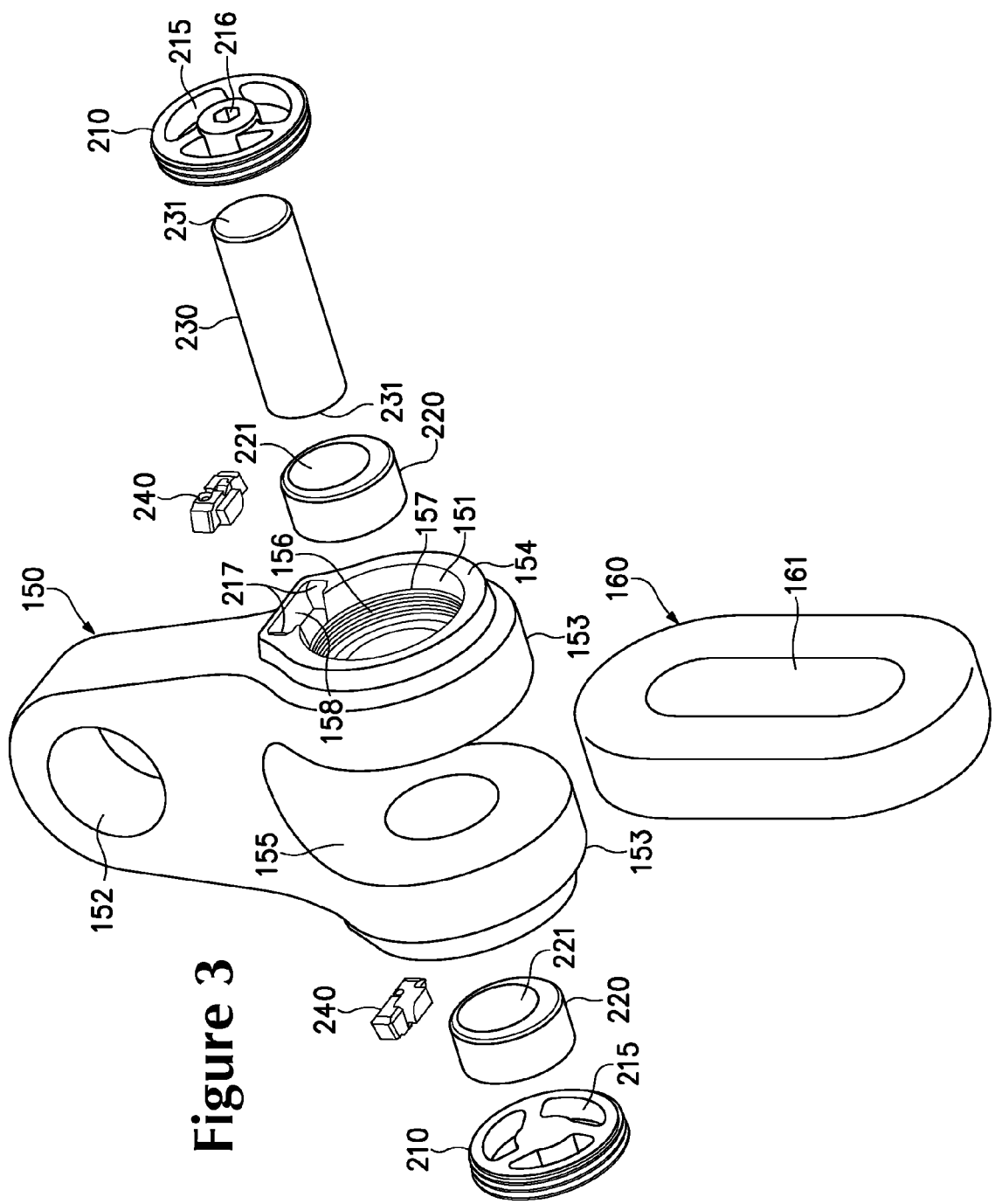
FIG. 3 is an exploded perspective view of the first connection system.
Figure 4:
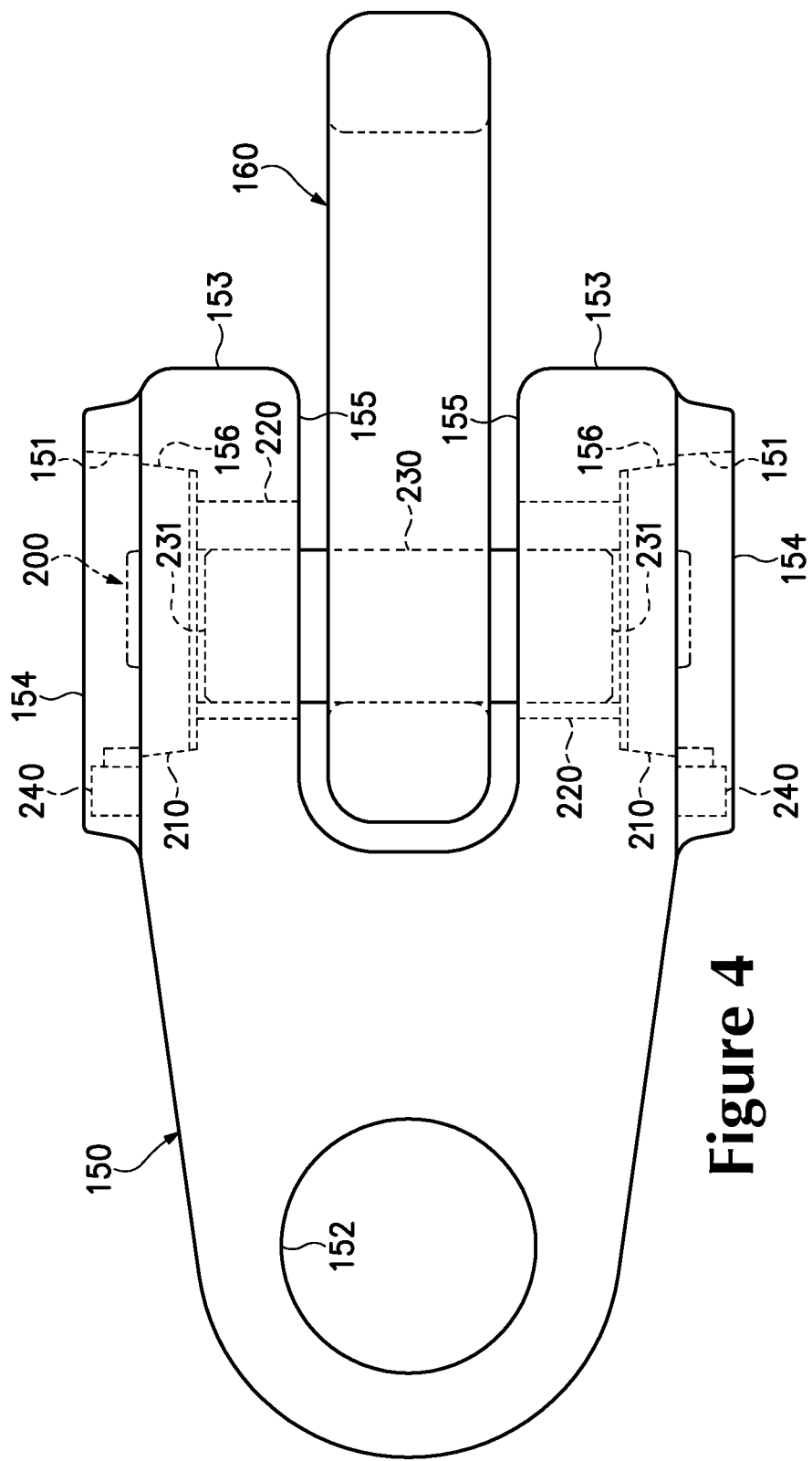
FIG. 4 is a top plan view of the first connection system.
Figure 5:
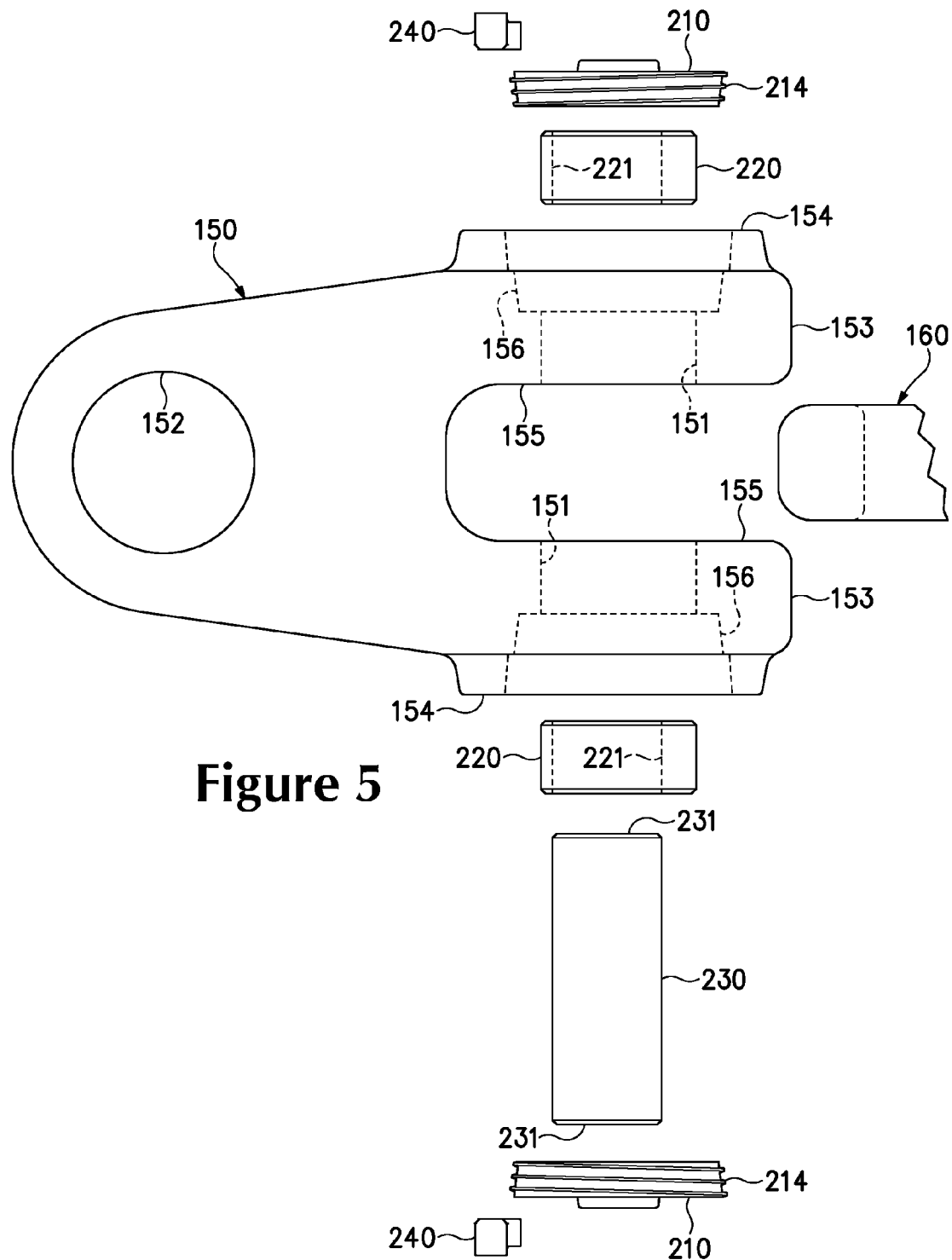
FIG. 5 is an exploded top plan view of the first connection system.

With reference to FIG. 1, one example of a dragline excavating system 100 with a dragline bucket 110 and rigging 115 that may be utilized in mining and earth moving operations is depicted. Bucket 110 includes a plurality of excavating teeth 111 and a central accumulation area 112. Excavating teeth 11 engage the ground to break-up or otherwise dislodge dirt, rocks, and other debris, which are then collected within accumulation area 112. Rigging 115 includes various hoist chains 120, dump ropes 130, and drag chains 140. By adjusting the orientation (i.e., tilt or angle) of dragline bucket 110 with dump ropes 130, excavating teeth 111 may be positioned to engage the ground, bucket 110 may be tilted upward to retain the contents of dragline bucket 110 within accumulation area 112, and bucket 110 may be tilted downward to dump the contents of dragline bucket. Drag chains 140 move dragline bucket 110 in a forward direction across the ground, thereby inducing excavating teeth 111 to engage the ground and break-up or otherwise dislodge the dirt, rocks, and other debris.

As dragline excavating system 100 is utilized, the dirt, rocks, and other debris may abrade bucket 110 and portions of rigging 115 that contact or slide against the ground. Connections between the various elements of dragline excavating system 100 may also experience wear in areas where surfaces of the elements bear against each other and are subjected to tensile, compressive, abrasive, or various other forces Given the effects of the abrasion and stresses, the various elements of dragline excavating system 100 are subject to routine maintenance, which may involve inspecting, disassembling, repairing, or replacing the elements. Many of the connections between the elements of dragline excavating system 100 are pinned connections. That is, a pin extends through two connection elements to effectively join the connection elements together. As examples only, pinned connections may be utilized to join a variety of connection elements, including hoist chains 120 to the trunions or the spreader bar, a dump block to the connector joining it to the hoist chain 120, or a socket of a dump rope 130 to an arch of dragline bucket 110. As another example, which is discussed below, a pinned connection may be utilized to join a connector 150 to a drag chain 140, thereby joining the drag chain 140 to bucket 110. As yet another example, which is also discussed below, a pinned connection may be utilized to join a connector 350 to a drag chain 140, the drag rope, and dump rope 130.

As discussed in the Background section above, mining and earth moving operations are generally halted during periods of maintenance. In addition to the time consumed by the maintenance process, repeated welding and cutting may degrade or otherwise damage the joined elements of a dragline excavating system. In order to decrease the time consumed by periods of maintenance and reduce the need for welding and cutting, one or more connection systems 200 and 400 may be utilized to form pinned connections within dragline excavating system 100.

First Connection System Configuration

Connection system 200 may be utilized to form a pinned connection that joins various connection elements. FIGS. 2-8 show a connection system 200 in the context of a connector 150 and an end link 160 from one of the drag chains 120. Connector 150, which forms a first connection element, defines a pair of aligned apertures 151 at one end and another aperture 152 at the opposite end. End link 160, which forms a second connection element, defines an aperture or hole 161 that generally aligns with apertures 151. A pin 230 extends through apertures 151 and 161 to join connector 150 with end link 160, thereby forming a pinned connection between the connection elements. Aperture 152 is adapted to join connector 150 to bucket 110 by conventional means, but could be adapted to use connection system 200 as well. In addition, connection system 200 may be utilized to form pinned connections between other elements of dragline excavating system 100 or in other environments.

Connector 150 includes a pair of spaced arms 153 that each have an outward surface 154 and an opposite inward surface 155. Each aperture 151 extends between surfaces 154 and 155 to form aligned openings, and each aperture 151 has a tapered portion 156 with a frustroconical configuration. That is, tapered portions 156 of apertures 151 have surfaces with tapered shapes similar to truncated cones. Moreover, apertures 151 taper in a direction extending from outward surfaces 154 toward inward surfaces 1551 such that the larger diameters of tapered portions 156 are proximal to outward surfaces 154 and the smaller diameters are proximal to inward surfaces 155. Tapered portions 156 each include threads 157, which preferably have a relatively large pitch, although the pitch of threads 157 may vary significantly. In areas adjacent to inward surfaces 155, apertures 151 preferably have generally cylindrical or otherwise non-tapered configurations. In addition, outward surfaces 154 define a pair of locking formations 158 located adjacent to apertures 151, which are preferably formed as indentations.

Connection system 200 includes a pair of inserts which in this embodiment, are formed to function as retainers 210. Connection system 200 also preferably includes a pair of bushings 220, a pin 230, and a pair of locks 240. Retainers 210 are preferably secured within tapered portions 156 of apertures 151. Bushings 220, which may be absent from some configurations, are preferably adjacent to retainers 210 and located within the generally cylindrical portions of apertures 151. Pin 230 extends at least partially into apertures 151 and into each of bushings 220 such that ends 231 of pin 230 are adjacent to and may contact retainers 210. Pin 230 extends across the space between arms 153. When end link 160 is joined to connector 150, pin 230 extends through aperture 161 to join the drag chain 140 to connector 150. In order to prevent retainers 210 from rotating and becoming dislodged from apertures 151, locks 240 are preferably located within locking formations 158 and extend over portions of retainers 210. Although locks 240 provide a suitable system for preventing retainers 210 from rotating and becoming dislodged from apertures 151, a variety of other locking arrangements may also be utilized.

Retainers 210 are located on opposite sides of pin 230 and prevent pin 230 from being ejected or removed from connector 150. Each of retainers 210 include an outward surface 211, an opposite inward surface 212, and a tapered surface 213, as depicted in FIGS. 9 and 10. When retainers 210 are located within apertures 151, outward surfaces 211 are preferably recessed into outward surfaces 154 and are positioned to contact a portion of locks 240, but may alternatively be flush with or protrude from outward surfaces 154 in some configurations. In addition, inward surfaces 212 are oriented to face bushings 220 (if used) and pin 230 when retainers 210 are located within apertures 151. Inward surfaces 212 may, therefore, contact or be spaced from bushings 220 and pin 230. Each tapered surface 213 is an outer rim that extends between surfaces 211 and 212 and gives each of retainers 210 a frustroconical configuration that corresponds in shape and dimension with tapered portions 156 of apertures 151. Tapered surfaces 213 also include threads 214 to match threads 157. In a preferred construction, each thread 214 is defined by a helical groove and each thread 157 by a helical projection. Nevertheless, other thread formations could be used. As with threads 157, therefore, threads 214 preferably have a relatively large pitch, although the pitch may vary significantly. An advantage to a large pitch is that relatively large portions of tapered surfaces 213 contact tapered portions 156 of apertures 151 and form load bearing areas. That is, a large pitch increases the load bearing areas between tapered surfaces 213 and apertures 151. A large pitch also provides more translation of the retainer when turned so that less rotation is needed to remove the retainer.

An advantage of the corresponding frustroconical configurations and the corresponding thread configurations is that a relatively small rotation in each of retainers 210 is sufficient to separate retainers 210 from connector 150. More particularly, the frustroconical configurations coupled with the relatively large pitch in threads 157 and 214 impart a structure wherein retainers 210 move out of their set positions (i.e., where tapered surfaces 213 contact or bear against the surfaces of apertures 151) when rotated a relatively small degree. That is, rotating retainers 210 between one-half and five turns may be sufficient to separate retainers 210 from connector 150, depending upon the pitch of threads 157 and 214 and the specific frustroconical configuration that is selected. During use of dragline excavating system 100, misalignment may occur from wear and fines (i.e., relatively small particles or dust) from the dirt, rocks, and other debris may become compacted or otherwise lodged into connection system 200. Even when the elements are misaligned or fines are present, however, retainers 210 move out of their set positions with a relatively small rotation.

Each of retainers 210 preferably define various apertures 215 that extend between surfaces 211 and 212. Although three apertures 215 are depicted for each of retainers 210, the number of apertures 215 in each of retainers 210, as well as the shape and area of apertures 215, may vary significantly. During periods of maintenance, personnel may visually-inspect the condition of bushings 220 and pin 230 through apertures 215. That is, apertures 215 permit portions of bushings 220 and pin 230 to be inspected without disassembling connection system 200. Although some prior retainers may permit a degree of inspection without removal of the retainers, apertures 215 may permit a greater portion of bushings 220 and pin 230 to be inspected when retainers 210 are located within apertures 151. Outward surfaces 211 also define a hex-shaped socket 216 that interfaces with a removal tool when retainers 210 are removed, although a variety of configurations for sockets 216, or other tool engaging formations, may be utilized. In situations where further inspection or replacement of bushings 220 and/or pin 230 is desired, one or both of retainers 210 may be separated from apertures 151 without the need for a welding torch due to the mechanical interface between retainers 210 and connector 150.

Bushings 220 have a generally cylindrical configuration that fits within apertures 151 adjacent to inward surfaces 155. Each bushing 220 defines an opening 221. Although openings 221 may extend through central areas of bushings 220, openings 221 are depicted as being offset from the central areas. That is, axes extending through centers of bushings 220 are offset from axes extending through centers of openings 221. When positioned within apertures 151, the portions of bushings 220 preferably having greater thicknesses (as measured from surfaces of openings 221 to outer surfaces of bushings 220) may be oriented to provide additional wear material in areas that are most subject to forces that cause abrasive wear and galling. Although the relative positions of retainers 210 and bushings 220 may vary, the centers of retainers 210 are depicted as being aligned with the centers of bushings 220. Socket 216 is preferably placed at the actual center of retainer 210 for easier turning during installation and removal. In some configurations of connection system 200, bushings 220 may be absent such that pin 230 directly contacts connector 150. Additionally, other components or types of bushings may be utilized in addition to or in place of bushings 220.

Pin 230 has a generally cylindrical configuration that corresponds with a diameter of openings 221 in bushings 220. In this configuration, ends 231 of pin 230 extend into openings 221 such that a central area of pin 230 extends across the space between arms 153. When end link 160 is joined to connector 150, pin 230 extends through end link 160. More particularly, end link 160 is located between arms 153 and pin 230 extends through aperture 161 of end link 160. As noted above, the centers of bushings 220 are offset from the centers of openings 221. A central axis of pin 230 is, therefore, also offset from the centers of bushings 220. Similarly, the centers of retainers 210 are offset from the center of pin 230, although the relative positions of retainers 210, bushings 220, and pin 230 may vary. Although one or both of the ends 231 of pin 230 may be fixed, pin 230 is depicted as having the configuration of a floating pin (i.e., a pin that is free of a head or other means for securing the pin and are generally free to rotate and translate but for retainers 210).

Locks 240 each include a first body 241 and a second body 242 that exhibit a generally L-shaped configuration, as depicted in FIGS. 11-13. First body 241 includes a post 243 that extends into a complementary hole 244 in second body 242 to pivotally-couple bodies 241 and 242 together. Bodies 241 and 242 cooperatively form a channel 245 with a conical or frustroconical shape. A portion of channel 245 formed by second body 242 is threaded, and a corresponding threaded locking element 246 that also preferably has a conical or frustroconical shape is threaded into channel 245. In alternative configurations, first body 241 may be threaded or both bodies 241 and 242 may be threaded. Although channel 245 and locking element 246 are depicted as having a conical or frustroconical shape, these elements may also exhibit a generally cylindrical configuration. Locking element 246 could also have a non-threaded configuration and retained in the lock by other means. When locking element 246 is located within channel 245, bodies 241 and 242 are restricted from pivoting about post 243 or becoming separated, particularly when also restricted by the surfaces of locking formations 158. When locking element 246 is absent from channel 245, however, bodies 241 and 242 may pivot about post 243. Additional details concerning locks 240 may be found with reference to U.S. patent application Ser. No. 11/818,483, which was filed on 13 Jun. 2007 and entitled Lock For Securing Wear Parts To Earth-Working Equipment and is incorporated herein by reference.

When locks 240 are located within locking formations 158, end areas of locks 240 extend into undercut notches 217 within ends of locking formations 158. In addition, the inner surfaces of protrusions 247, which extend outward from second bodies 241, oppose and may contact outward surfaces 211 of retainers 210. During the use of dragline excavating system 100, various forces may induce retainers 210 to rotate and loosen, thereby tending to separate retainers 210 from apertures 151 of connector 150. The presence of locks 240, however, limits the degree to which retainers 210 may rotate and loosen. That is, as retainers 210 rotate, protrusions 247 contact or otherwise bear against outward surfaces 211 and effectively limit the rotation of retainers 210. Moreover, as retainers 210 press upward on protrusions 247, the upward force tends to bind locks 240 within locking formations 158. Accordingly, the presence of locks 240 effectively prevents retainers 210 from rotating and separating from connector 150. During periods of maintenance, however, locks 240 may be removed from locking formations 158 to permit retainers 210 to be removed. In configurations where protrusions 247 are absent, other portions of locks 240 may extend over retainers 210. As discussed in greater detail below, additional structures or mechanisms may also be utilized in place of locks 240.

Disassembly and Assembly Processes

The various elements of dragline excavating system 100 are routinely maintained due to the stresses that arise in dragline excavating system 100 and the effects of abrasion from the dirt, rocks, and other debris. In order to begin the disassembly process of connection system 200, locking element 246 of at least one lock 240 is initially removed from channel 245. Given that fines from the dirt, rocks, and other debris may become compacted into connection system 200 and misalignment may result from wear and installation, removing conventional threaded connections may be relatively difficult. Channels 245 and locking elements 246, however, preferably have corresponding frustroconical configurations. When rotated a relatively small degree, therefore, locking element 246 moves out of its set position and the surface of locking element 246 separates from the surface of channel 245. In this configuration, therefore, locking element 246 may be removed from channel 245 with relative ease even when debris is compacted into areas between the threads of channel 245 and locking element 246.

Once locking element 246 is removed from lock 240T the lock is pivoted upward to disengage ends 249 of lock 240 from the undercut notches 217 within the ends of locking formations 158. Following the removal of lock 240, retainer 210 may rotate to facilitate removal. More particularly, a tool having a hex-shaped interface (or any interface suitable for joining with sockets 216) may be located within socket 216 to assist in rotating retainer 210. As with channel 245 and locking element 246, retainer 210 and aperture 151 have corresponding frustroconical configurations. When rotated a relatively small degree, therefore, retainer 210 moves out of its set position and the surface of retainer 210 separates from the surface of aperture 151. An advantage of this configuration is that retainer 210 may be removed from aperture 151 even when the fines are compacted into areas between tapered surfaces 213 and apertures 151 and also between threads 157 and 214.

Once retainers 210 are loosened (i.e., out of their set positions), retainers 210 may be removed from apertures 151, thereby exposing bushings 220 and pin 230. An advantage to mechanically-securing retainers 2101 as opposed to welding, is that unobstructed inspection of bushings 220 and pin 230 may be performed without utilizing a welding torch. That is, retainers 210 may be removed without a welding torch to permit bushings 220 and pin 230 to be visually-inspected. The bushings 220 and pin 230 may then be inspected and/or removed.

The assembly process is substantially similar to the disassembly process, but performed in a reverse order One aspect regarding the assembly process relates to the installation of retainers 210 and locks 240. In order for locks 240 to fit within locking indentations 158 such that protrusions 247 extend over outward surfaces 211, retainers 210 should extend into apertures 151 to a position that is level with or recessed below locking formations 158. Although threads 157 and 214 may be formed such that tightening retainers 210 to the set positions aligns inward surfaces of locking indentations 158 and outward surfaces 211, the dirt, rocks, and other debris that are typically present around mining and earth moving operations may affect the degree to which retainers 210 rotate within apertures 151. Also, limitations on tolerances in sand casting or other manufacturing processes for connector 150 and retainers 210 may affect the degree to which retainers 210 rotate within apertures 151. In order to ensure that locks 240 may be properly installed (e.g., fully set within locking formations 158), threads 157 and 214 may be configured such that retainers 210 are recessed below protrusions 247 when fully tightened to the set positions. Some loosening of retainers 210 will then place outward surfaces 211 in contact with protrusions 247, thereby limiting further loosening of retainers 210.

Additional Configurations

The above discussion of connection system 200 provides an example of one structure and use for connection system 200. Referring to FIG. 14, an example of an alternative configuration in which connector 350 incorporates connection system 200 is depicted.

In addition to the various applications in which connection system 200 may be utilized, the configuration of connection system 200 may vary significantly. Referring to FIG. 15, connection system 200 has a configuration wherein only one retainer 210 is present. Whereas connector 150 defined two apertures 151 extending completely through the arms in the configuration discussed above, connector 150 in this configuration forms a single aperture 151 that extends completely through the arm, which receives the sole retainer 210. Retainers 210 and the corresponding portions of apertures 151 are described above as being tapered along their threads, but may have non-tapered threaded configurations, as depicted in FIG. 16. In another configuration, apertures 215 may be absent from retainers 210, as depicted in FIG. 17. Accordingly, various aspects or elements of connection system 200 that are described above may be absent or otherwise modified in some configurations.

Additional structures or mechanisms may also be utilized in place of locks 240 to prevent or limit the rotation of retainers 210. Locks 240 may, therefore, be absent in some configurations of connection system 200, and other systems that secure retainers 210 to connector 150 may be utilized. Referring to FIG. 18, a pair of elastomer or rubber plugs 159 are recessed into apertures 151 and contact threads 214 in order to secure the positions of retainers 210 without locks 240. In some configurations, both locks 240 and plugs 159 may be utilized in combination. Referring to FIGS. 19 and 20, frustroconical set screws 248 having configurations similar to locking elements 246 extend into connector 150 and bear against portions of retainers 210 in order to limit the rotation of retainers 210. Set screws having other configurations may also be utilized in the configurations of FIGS. 19 and 20. In other configurations, metal straps secured across apertures 151 and adjacent to outward surfaces 211 may be utilized to secure retainers 210 in the absence of locks 240. As another example, a locking mechanism having the configuration disclosed in U.S. Pat. No. 5,088,214 to Jones, which is incorporated herein by reference, may be utilized in place of locks 240.

As a further matter, connector 150 may be cast to define apertures 151 and threads 157. Existing connectors may also be retrofit to define one or more apertures with the configuration of apertures 151. That is, apertures similar to apertures 151 may be milled into an existing element such that connection system 200 may be utilized with the existing element. As a further alternative, a threaded insert with a frustroconical configuration may also be welded or otherwise secured into existing elements for incorporating connection system 200.

Second Connection System Configuration

Connection system 400 may be utilized to form a pinned connection that joins various connection elements. With reference to FIGS. 21-25, connector 350 and link element 360 are depicted using connection system 400. Connector 350, which forms a first connection element, has an angled structure defining various apertures 351-353. Link element 360, which forms a second connection element, defines a pair of apertures 361. Pin 420 extends through apertures 351 and one of apertures 361 to join connector 350 with Fink element 360, thereby forming a pinned connection between the connection elements. The particular connector 350 illustrated is used to secure a socket from one of the drag ropes to a dump rope and a drag chain. Connection systems that are similar to connection system 400 may also be utilized at each of apertures 352 and 353 to respectively form a pinned connection with one of drag chains 140 and one of the sockets from dump rope 130. Accordingly, although connection system 400 is depicted in association with apertures 351, similar connection systems may be utilized to form pinned connections in other areas of connector 350. In addition, connection systems that are similar to connection system 400 may be utilized to form pinned connections between other elements of dragline excavating system 100 or other environments.

Connector 350 includes a pair of spaced arms 354 that each have an outward surface 355 and an opposite inward surface 356. Each aperture 351 extends between surfaces 355 and 356 to form aligned openings with frustroconical configurations. That is, each aperture 351 has a tapered shape similar to a truncated cone. Moreover, apertures 351 taper in a direction extending from outward surface 355 to inward surface 356, such that a diameter of each aperture 351 is greater at outward surface 355 than at inward surface 356. Surfaces of apertures 351 each include threads 357, which preferably have the configuration of a helical protrusion with a relatively large pitch, although the pitch of threads 357 may vary significantly. In addition, a pair of undercut notches 358 may be formed at each of outward surfaces 355 and on opposite sides of apertures 351. Although each aperture 351 preferably tapers across the entire width of the arm, it could include a non-tapering to one or each side of a tapering portion.

Connection system 400 includes a pair of inserts which in this embodiment are formed to function as bushings 410. Connection system 400 also includes pin 420 and a pair of locks 440. Bushings 410 may be secured within apertures 351 such that pin 420 extends at least partially into apertures 351 (i.e., into bushings 410), across the space between arms 354, and through link element 360. In order to prevent bushings 410 from rotating and becoming dislodged from apertures 351, locks 440 extend into notches 358. In this configuration, pin 420 securely joins link element 360 to connector 350. Although locks 440 provide a suitable system for preventing bushings 410 from rotating and becoming dislodged from apertures 351, a variety of other systems may also be utilized, including many of the systems discussed above for connection system 200.

Bushings 410 each includes an outward surface 411, an opposite inward surface 412, and a tapered surface 413, as depicted in FIGS. 26-29. When bushings 410 are located within apertures 351, outward surfaces 411 are preferably substantially flush with outward surfaces 355, and inward surfaces 412 are substantially flush with inward surfaces 356. In some configurations, however, surfaces 411 and 412 may be recessed, may protrude from, or may be otherwise offset from surfaces 355 and 356. Tapered surfaces 413 extend between surfaces 411 and 412 and impart frustroconical configurations to bushings 410 that correspond in shape and dimension with apertures 351. Tapered surfaces 413 also include threads 414, which preferably have the configuration of a helical groove that substantially matches or corresponds with the pitch of threads 357 (although other thread formations can be used). As with threads 357, therefore, threads 414 have a relatively large pitch, although the pitch may vary significantly. An advantage to a large pitch is that relatively large portions of tapered surfaces 413 contact surfaces of apertures 351 and form load bearing areas. That is, a large pitch increases the load bearing areas between tapered surfaces 413 and apertures 351.

An advantage of the corresponding frustroconical configurations and the corresponding thread configurations is that a relatively small rotation in each of bushings 410 is sufficient to separate bushings 410 from connector 350. More particularly, the frustroconical configurations coupled with the relatively large pitch in threads 357 and 414 create a structure wherein bushings 410 move out of their set positions (i.e., where tapered surfaces 413 contact or bear against the surfaces of apertures 351) when rotated a relatively small degree. That is, rotating bushings 410 between one-half and five turns may be sufficient to separate bushings 410 from connector 350, depending upon the pitch of threads 357 and 414 and the specific frustroconical configuration that is selected. During use of dragline excavating system 100, misalignment may occur from wear and fines (i.e., relatively small particles or dust) from the dirt, rocks, and other debris may become compacted or otherwise lodged into connection system 400. Even when the elements are misaligned or fines are present, however, bushings 410 move out of their set positions with a relatively small rotation.

Outward surfaces 411 each define a locking groove 415 that receives one of locks 440. Locking grooves 415 extend across bushings 410 and align with notches 358 when bushings 410 are located within apertures 351. Locks 440 are each located within and recessed into one of locking grooves 415, and ends 449 of locks 440 extend into notches 358. In this configuration, locks 440 prevent bushings 410 from rotating and thereby effectively secure bushings 410 to connector 350.

Inward surfaces 412 each preferably define a frustroconical or otherwise tapered cavity 416 that receives an end 421 of pin 420. Given the stresses induced in the various elements of dragline excavating system 100, abrasive wear and galling may occur in pinned connections. In order to reduce abrasive wear and galling in the contact area between ends 421 and cavities 416, bushings 410 preferably include a pair of overlays 417 within cavities 416. Although a variety of materials with relatively high wear-resistance and non-galling properties may be utilized for overlays 417, suitable materials include a range of cobalt-chromium alloys that may also contain tungsten and carbon, such as STELLITE, which is produced by the Delloro Stellite Group of Goshen, Ind. In some configurations, overlays 417 also or alternatively may be incorporated into the end areas of pin 420, or overlays 417 may be absent from connection system 400. Given that the material selected for overlays 417 provides relatively high wear-resistance and non-galling properties, the material selected for the remainder of bushings 410 may impart other beneficial properties, such as high dimensional stability for threads 414, for example.

Pin 420 has a generally cylindrical configuration. Ends 421 of pin 420, however, preferably exhibit a frustroconical or otherwise tapered configuration. An advantage of the tapered configuration in ends 421 relates to joining pin 420 with bushings 410 and separating pin 420 from bushings 410. More particularly, pins with the tapered ends extend into cavities 416 and retract from cavities 416 more easily than pins with non-tapered ends. Even when ends 421 are not perfectly aligned with cavities 416, the tapered configuration permits ends 421 to extend into cavities 416 and become properly seated within cavities 416. Similarly, even when fines from the dirt, rocks, or other debris are compacted into connection system 400, the tapered configuration permits ends 421 to be more easily withdrawn from cavities 416. Although one or both of ends 421 may be fixed, pin 420 is depicted as having the configuration of a floating pin (i.e., a pin that is free to rotate).

Some prior pinned connections incorporate bushings and separate retainers (e.g., the welded plates). Whereas the bushings extend around the pin to restrain movement of the pin, the retainers extend over ends of the pin to restrain axial movement of the pin. An advantage to connection system 400, however, is that bushings 410 effectively provide the functions of both the bushings and retainers of the prior pinned connections. That is, bushings 410 are sufficient to restrain movement of pin 420. Moreover, there is no welding required. The threaded connection for the bushings is also very much easier to install and remove as compared to the press fit or welded bushings.

Link element 360 has a configuration that joins with connector 350 and a socket from one of the drag ropes. More particularly, pin 420 extends through one of apertures 361 to secure link element 360 to connector 350, and the socket may be secured through the other one of apertures 361. Link element 360 is utilized, therefore, to effectively join one of the sockets to connector 350. In some configurations, however, connecting link 360 may be absent such that pin 420 extends through and connects directly with one of the sockets.

Locks 440 are very similar to locks 240 and operate on the same concepts. Each includes a first body 441 and a second body 442 that exhibit a generally L-shaped configuration, as depicted in FIGS. 30-32. Second body 442 includes a post 443 that extends into a complementary hole 444 in first body 441 to pivotally-couple bodies 441 and 442 together. Bodies 441 and 442 cooperatively form a threaded channel 445 with a conical or frustroconical shape. A corresponding threaded locking element 446 that also has a conical or frustroconical shape is threaded into channel 445. Although channel 445 and locking element 446 are depicted as having a conical or frustroconical shape, these elements may alternatively have a generally cylindrical configuration. When locking element 446 is located within channel 445, bodies 441 and 442 are restricted from pivoting about post 443. When locking element 446 is absent from channel 445, however, bodies 441 and 442 may pivot about post 443. Additional details concerning locks 440 may be found with reference to U.S. patent application Ser. No. 11/818,483, which was filed on 13 Jun. 2007 and entitled Lock For Securing Wear Parts To Earth-Working Equipment and is incorporated herein by reference.

Disassembly and Assembly Processes

In order to begin the disassembly process of connection system 400, locking element 446 is initially removed from channel 445. Given that fines from the dirt, rocks, and other debris may become compacted into connection system 400 and misalignment may result from wear and installation, removing conventional threaded connections may be relatively difficult. Channel 445 and locking element 446, however, preferably have corresponding frustroconical configurations. When rotated a relatively small degree, therefore, locking element 446 moves out of its set position and the surfaces of the locking element 446 separate from the surfaces of channel 445. In this configuration, therefore, locking element 446 may be removed from channel 445 even when debris is compacted into areas between the threads of channel 445 and the locking element 446.

Once locking element 446 is removed, lock 440 may be pivoted upward (i.e., the inner ends of bodies 441 and 442 pivot upward about post 443) to disengage ends 449 of lock 440 from notches 358. Ends 449 extend into notches 358 and prevent bushings 410 from rotating when located within locking grooves 415. Following the removal of lock 440, however, bushing 410 may rotate to facilitate removal. As with channels 445 and retainers 446, bushings 410 and apertures 351 preferably have corresponding frustroconical configurations. When rotated a relatively small degree, therefore, bushing 410 moves out of its set position and the threaded surface of bushing 410 separates from the threaded surface of aperture 351. An advantage of this configuration is that bushing 410 may be removed from aperture 351 even when the fines are compacted into areas between tapered surface 413 and aperture 351 and also between threads 357 and 414.

Given the potential mass of the various elements of dragline excavating system 100 and the degree to which the fines may become compacted into portions of connection system 400, a removal apparatus 450 may be utilized to remove bushings 410 from apertures 351. Referring to FIGS. 33 and 34, removal apparatus 450 includes a housing 451, a spanner 452, and a centering tool 453. When assembled, housing 451 rests against outward surface 411, and lower portions of spanner 452 and centering tool 453 extend into locking groove 415. A flange in a lower area of housing 451 may also extend into slots in centering tool 453 to limit the movement of housing 451 away from bushing 410. Whereas spanner 452 rests against the sides of locking groove 415, protrusions in the lower portion of centering tool 453 extend into a pair of depressions 418 formed on opposite sides of locking grooves 415. When assembled in this manner, spanner 452 prevents centering tool 453 from rotating independent of bushing 410. That is, rotating centering tool 453 induces a corresponding rotation in bushing 410. Chains, cables or other securing devices may then be secured to eyelets on sides of housing 451 to limit the rotation of housing 451 relative to connector 350. Finally, centering tool 453 may be rotated to induce a corresponding rotation in one of bushings 410.

Once bushings 410 are loosened (i.e., out of their set positions), bushings 410 may be removed from apertures 351. As discussed above, the tapered ends 421 of pin 420 retract from cavities 416 more easily than non-tapered end areas, thereby permitting pin 420 to separate from bushings 410. Pin 420 is then withdrawn from link element 360 and apertures 351 to substantially complete the disassembly of connection system 400. In some other connection systems, hammers may be necessary to dislodge pins, particularly when debris is compacted into the system or when misalignment occurs as a result of installation or wear. Given that the diameter of pin 420 is significantly less than the diameter of apertures 351, however, pin 420 may be easily removed from connector 350. The disassembly process could involve the removal of both bushings 410 or only one of bushings 410. Given the tapered configuration in ends 421, pin 420 may generally be separated even when only one of bushings 410 is removed.

The assembly process is substantially similar to the disassembly process, but is performed in a reverse order. An advantage of connection system 400 relates to the installation of pin 420. Some conventional processes for installing a pin may require hammering to position the pin through each of the bushings. However, in the present invention, insertion of the pin is made easier because only one bushing is installed when the pin is inserted With only one of bushings 410 installed, pin 420 may be easily inserted through the relatively large opening formed by one of apertures 351 without the bushing to rest within cavity 416 of the one bushing that is install Then, the other bushing 410 may be installed. Another aspect regarding the assembly process relates to the installation of bushings 410 and locks 440. In order for locks 440 to fit within locking grooves 415 and notches 358, locking grooves 415 must align with notches 358. Although threads 357 and 414 may be formed such that tightening bushings 410 to the set positions aligns locking grooves 415 and notches 358, the dirt, rocks, and other debris that are typically present around mining and earth moving operations may affect the degree to which bushings 410 rotate relative to apertures 351. Also, limitations on tolerances in sand casting or other manufacturing processes for connector 350 and bushings 410 may affect the degree to which bushings 410 rotate relative to apertures 351. In order to ensure that locking grooves 415 and notches 358 may be aligned, threads 357 and 414 may be configured to permit locking grooves 415 to rotate past notches 358 when fully tightened to the set positions. By then loosening bushings 410, locking grooves 415 and notches 358 may be aligned.

Additional Configurations

The above discussion of connection system 400 provides an example of one structure and use for connection system 400. Referring to FIG. 35, an example of a configuration wherein connector 150 incorporates connection system 400 is depicted. Moreover, concepts associated with connection system 400 may be incorporated into other types of mining equipment, as well as other applications that include a wide range of dredging, forestry, and construction equipment.

Figure 36:
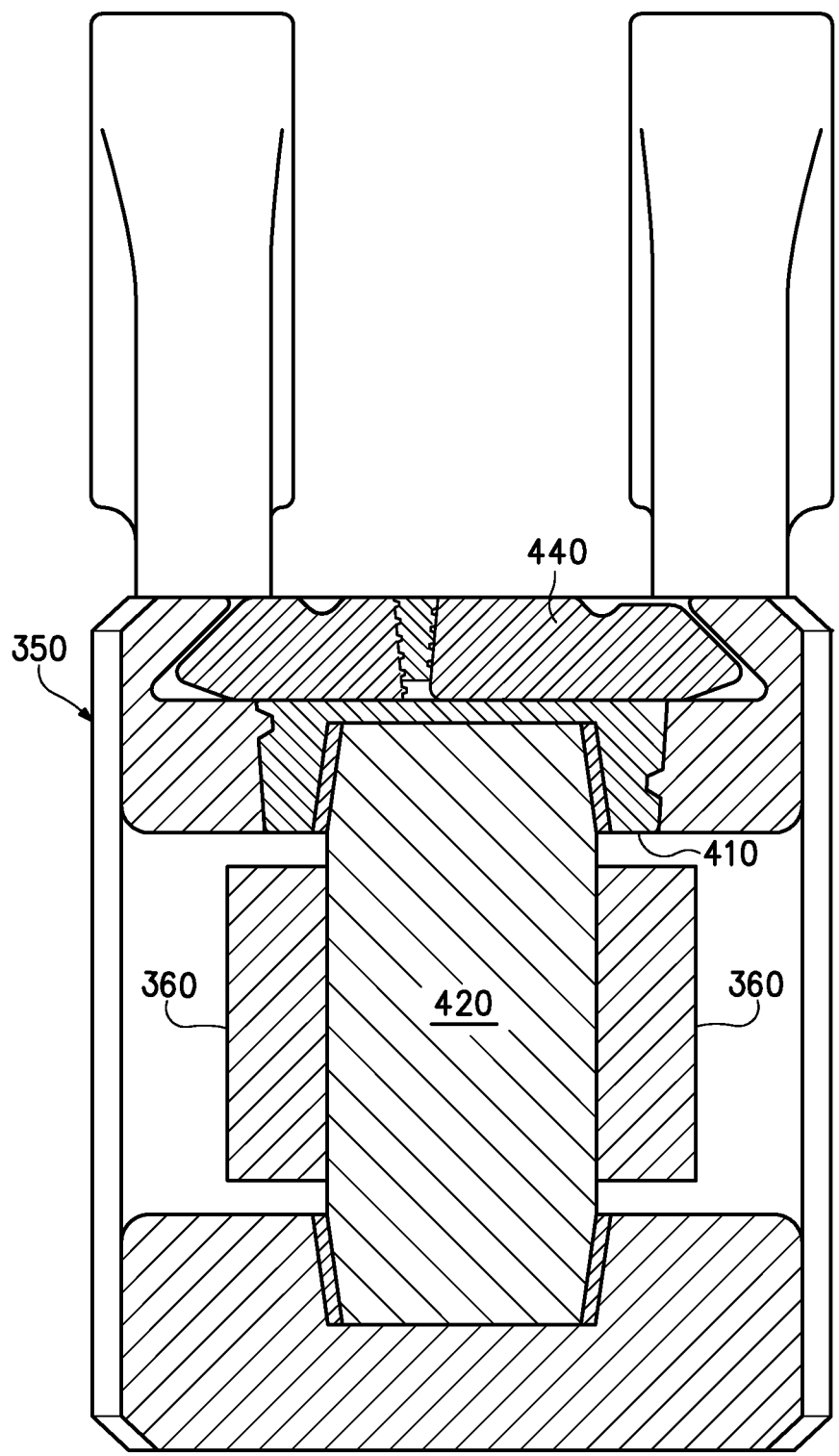
Figure 37:
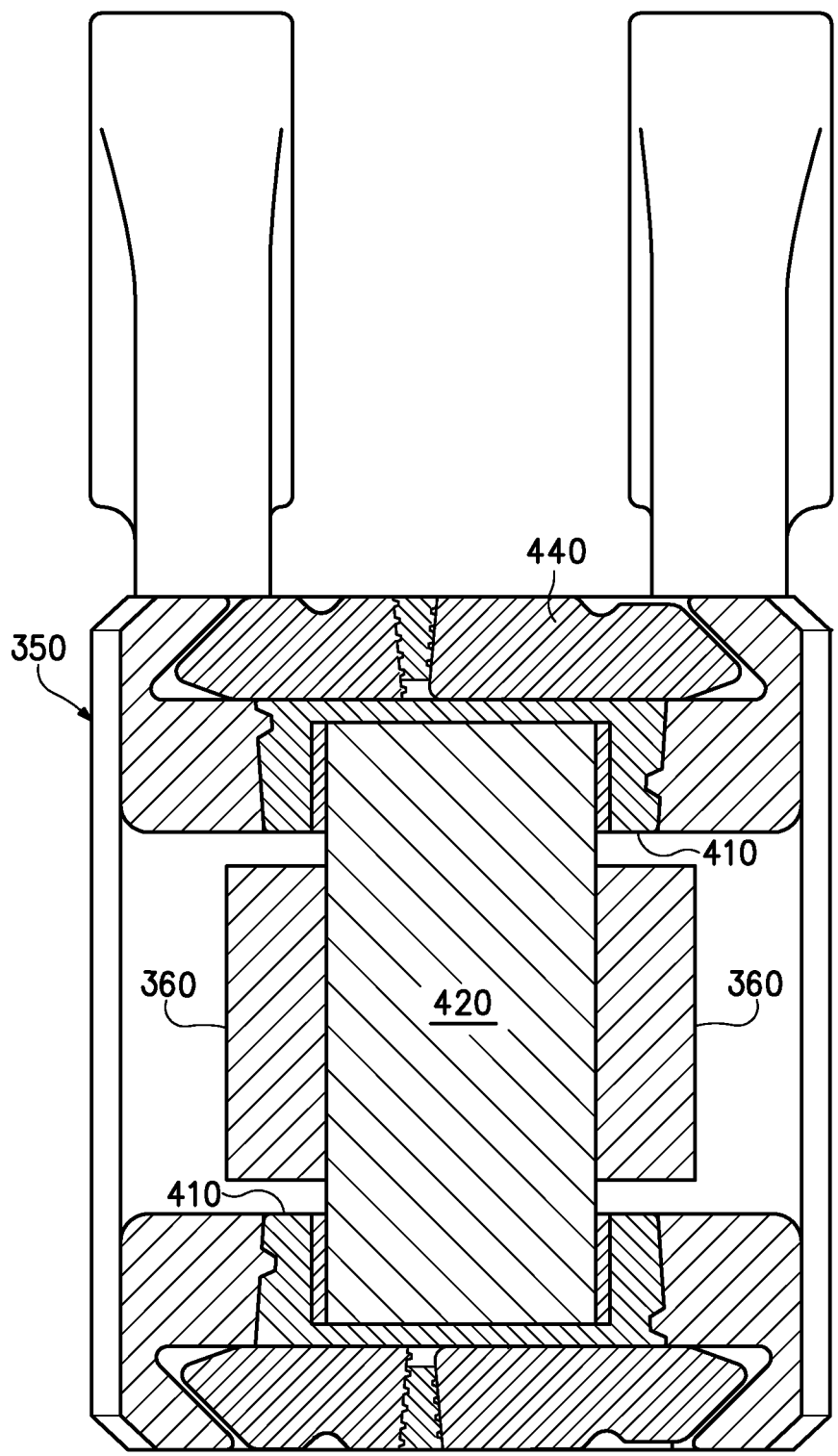
Figure 38:
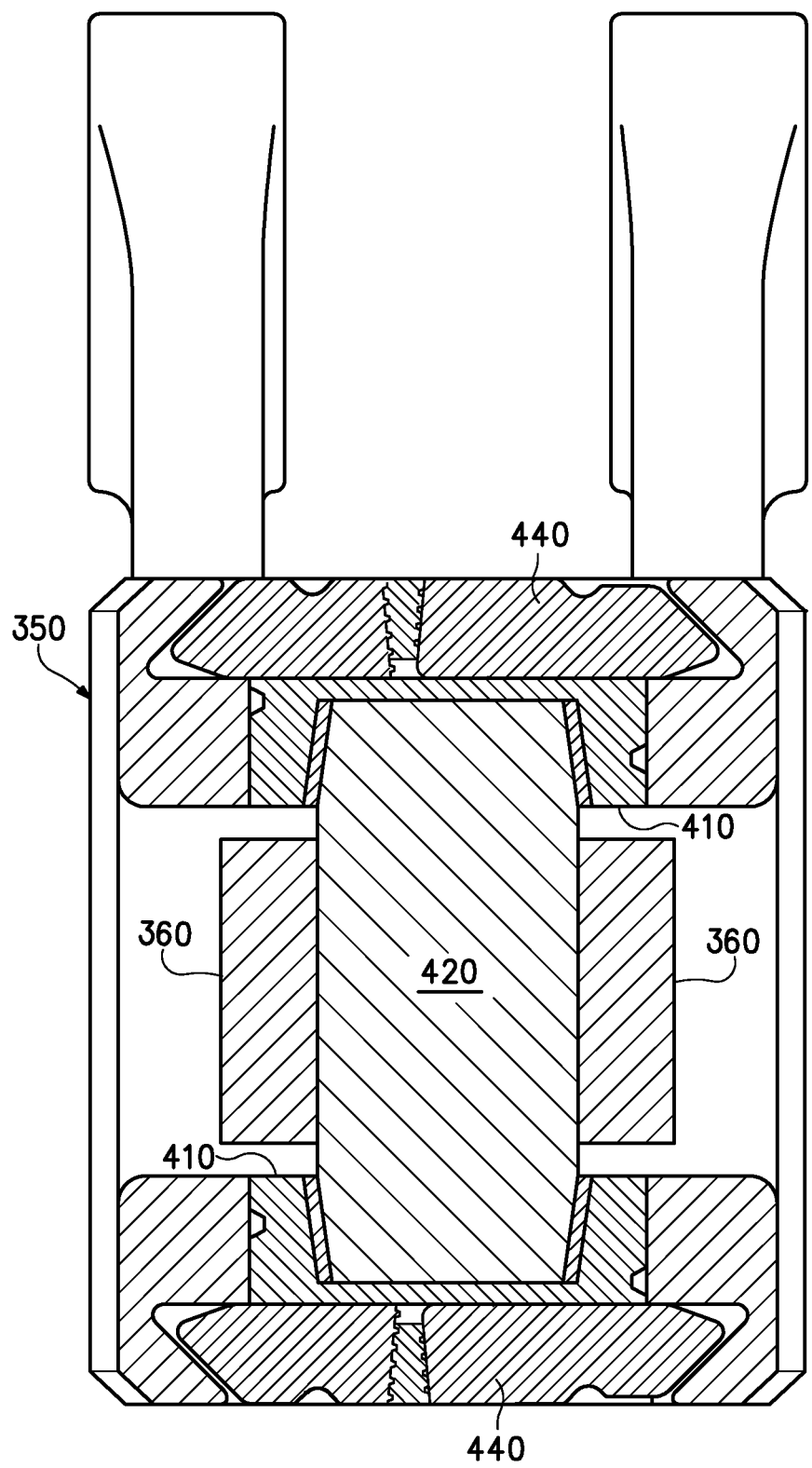
Figure 39:
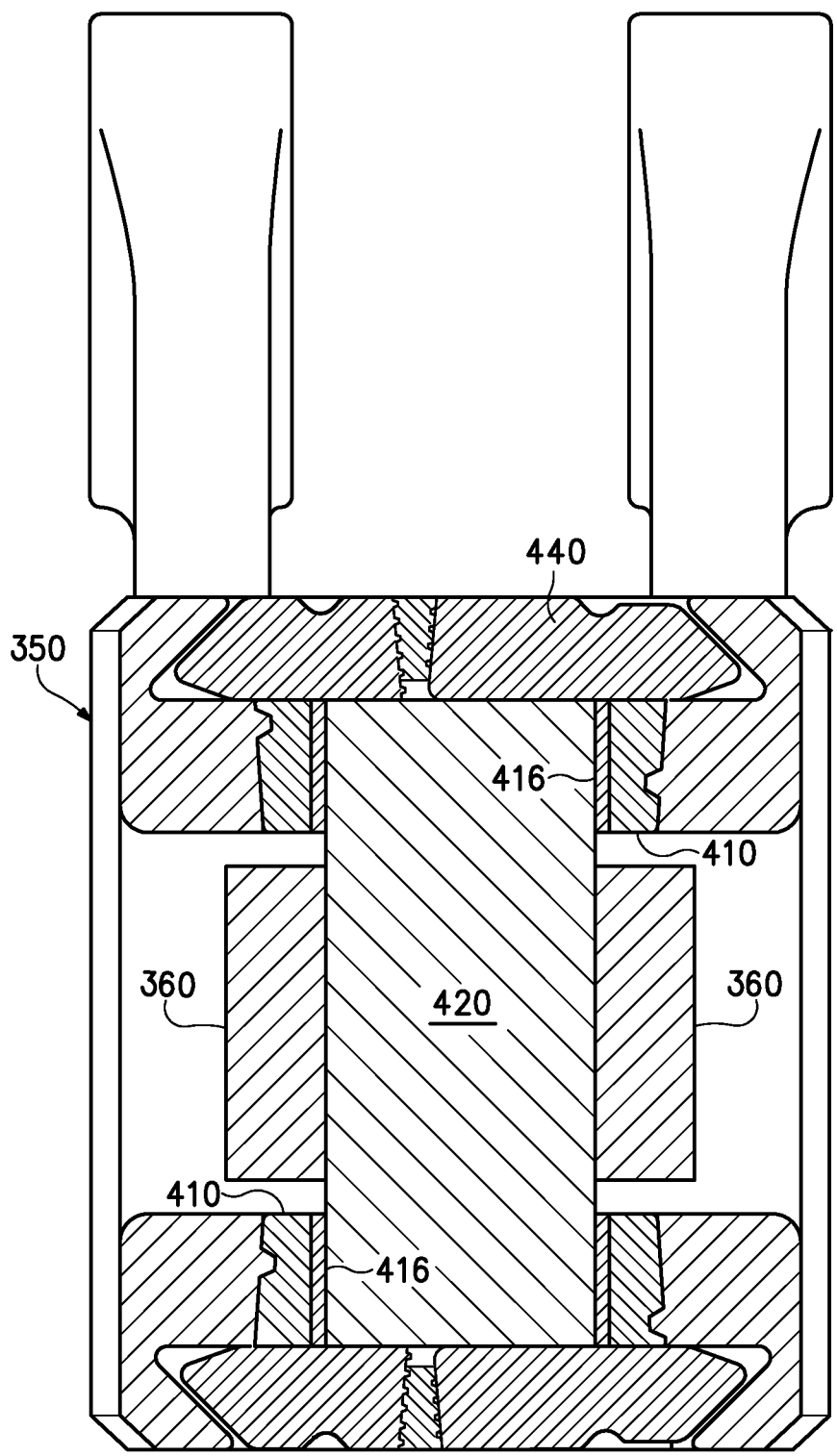

In addition to the various applications in which connection system 400 may be utilized, the configuration of connection system 400 may vary significantly. Referring to FIG. 36, connection system 400 has a configuration wherein only one bushing 410 is present. Whereas link 350 defined two apertures 351 in the configuration discussed above, link 350 in this configuration forms a single aperture 351 extends completely through one of the arms, which receives the sole bushing 410. Various elements of connection system 400 are also described above as being tapered, but may have a non-tapered configuration. Referring to FIG. 37, for example, pin 420 is depicted as having cylindrical, rather than tapered, ends. Similarly, bushings 410 are depicted as having cylindrical, rather than frustoconical, outer peripheral configurations in FIG. 38. As a further alternative, locking elements 446 of locks 440 may also have cylindrical configurations. Another configuration is depicted in FIG. 39, wherein cavities 416 extend entirely through bushings 410, thereby forming apertures that extend through bushings 410. In this configuration, pin 420 extends through cavities 416 and bears against locks 440, which form retainers that prevent pin 420 from being removed. Retainers 210 and locks 240 could also be used to secure bushings 410 in lieu of relying on locks 440 as shown in FIG. 39.

Additionally, locks 440 may be absent in some configurations of connection system 400, as depicted in FIG. 40. When locks 440 are absent, other systems that secure bushings 410 to connector 350 may be utilized, including elastomer or rubber plugs that are inserted between threads 357 and 414, metal straps secured across apertures 351 and adjacent to outward surfaces 411, or a set screw that extends between connector 350 and bushing 410. As another example, a locking mechanism having the configuration disclosed in U.S. Pat. No. 5,088,214 to Jones, which is incorporated herein by reference, may be utilized. Accordingly, various aspects or elements of connection system 400 that are described above may be absent or otherwise modified in some configurations.

As a further matter, connector 350 may be cast to define apertures 351 and threads 357. Existing links may also be retrofit to define one or more apertures with the configuration of apertures 351. That is, apertures may be milled into an existing link such that connection system 400 may be utilized with the existing link. As a further alternative, a threaded insert with a frustoconical configuration may also be welded or otherwise secured into existing links for incorporating connection system 400.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention.

The invention claimed is:

1. A pinned connection for connecting two components for earthmoving equipment together, the pinned connection comprising:

a first connection element defining a hole;

a second connection element having a pair of spaced apart arms straddling the first connection element, each said arm having an inward surface facing the first connection element and an opposite outward surface, each said arm defining an aperture in alignment with the hole along an axis, each said aperture having an inner portion adjacent the inward surface, at least one of said apertures extending between the inward and outward surfaces of said arm and having a tapered portion spaced from the first connection element and outside of the respective inner portion, said tapered portion tapering toward the inner portion to define a frustoconical shape, and a locking formation recessed in said arm and in communication with said at least one aperture proximate the at least one tapered portion;

a pin received through the hole in the first connection element and into the apertures of the second connection element to pivotally secure the first and second connection elements together;

an insert received into the tapered portion of the at least one said aperture, said insert including an inner surface facing toward one end of the pin, an opposite outer surface, and a rim extending between the inner and outer surfaces, the rim of said insert tapering toward the inner surface and corresponding to the taper of the tapered portion of the at least one said aperture, the rim of the insert and the tapered portion of the at least one said aperture having helical projections and grooves that are engaged such that said insert moves inward and outward along the axis when the insert is rotated about the axis, the insert being rotatable for inward movement to a closed position where the insert blocks passage of the pin through the at least one said aperture to prevent loss of the pin during use of the earthmoving equipment, said insert being rotatable for outward movement to disengage the rim of the insert from the tapered portion of the at least one said aperture with small rotation of the insert; and a retaining member being receivable in the locking formation and contacting the outer surface or the rim of the insert when the insert is in the closed position to retain the insert in the closed position and to prevent removal of said insert from the at least one said aperture, and the retaining member being movable to disengage the outer surface or the rim of the insert to permit removal of the insert from the at least one aperture, wherein said insert and said retaining member are within the outward surface of said arm for protection from earthen material during use.

2. The pinned connection of claim 1 comprising a bushing located within the inner portion of each said aperture, the bushing defining an opening that extends around the pin.

3. The pinned connection of claim 2 wherein a central axis of the pin is offset from a central axis of the bushing.

4. The pinned connection of claim 1 wherein the retaining member includes a pair of pivoting bodies that are moved relative to each other between a hold position that retains the retaining member in the locking formation when in use and a release position that permits insertion and removal of the retaining member into and from the locking formation.

5. The pinned connection of claim 1 wherein the retaining member contacts the outer surface of the insert to resist outward movement of the insert.

6. The pinned connection of claim 1 wherein the retaining member contacts the rim of the insert to resist outward movement of the insert.

7. The pinned connection of claim 1 wherein each said aperture includes one said tapered portion, and each said tapered portion receives one said insert.

8. The pinned connection of claim 7 wherein each said arm receives one said retaining member to contact one of the inserts.

* * * * *